United States Patent
Inoue et al.

[19]

[11] Patent Number: 5,825,971
[45] Date of Patent: Oct. 20, 1998

[54] MAGNETIC HEAD REPLACEMENT STRUCTURE IN HELICAL SCAN MAGNETIC RECORDING AND REPRODUCING APPARATUS AND METHOD THEREOF

[75] Inventors: Tohru Inoue; Tatsuo Yamasaki; Junichi Nose; Hideki Kaneko; Ken Onishi, all of Nagaokakyo, Japan

[73] Assignee: Mitsubishi Denki Kabushiki Kaisha, Tokyo, Japan

[21] Appl. No.: 862,421

[22] Filed: May 23, 1997

Related U.S. Application Data

[63] Continuation of Ser. No. 627,325, Apr. 4, 1996, abandoned, which is a continuation of Ser. No. 103,044, Jul. 28, 1993, abandoned.

[30] Foreign Application Priority Data

| Jul. 30, 1992 | [JP] | Japan | 4-203769 |
| Aug. 5, 1992 | [JP] | Japan | 4-208928 |
| Sep. 3, 1992 | [JP] | Japan | 4-235758 |
| Jan. 27, 1993 | [JP] | Japan | 5-011439 |

[51] Int. Cl.$^6$ .................................................... H04N 5/91
[52] U.S. Cl. .............................. 386/122; 386/46; 360/22; 360/64
[58] Field of Search ................................. 360/10.1, 10.3, 360/35.1, 22, 23, 64; 386/36, 122, 46

[56] References Cited

U.S. PATENT DOCUMENTS

| 4,617,598 | 10/1986 | Tsuruoka et al. | 360/10.3 |
| 4,796,104 | 1/1989 | Ito et al. | 360/35.1 X |
| 4,796,128 | 1/1989 | Takimoto | 360/10.3 |
| 4,897,739 | 1/1990 | Hasegawa et al. | 360/23 X |
| 5,267,102 | 11/1993 | Yamagata | 360/35.1 X |

FOREIGN PATENT DOCUMENTS

| 3113804 | 5/1991 | Japan . |
| 442875 | 7/1992 | Japan . |

OTHER PUBLICATIONS

"Application of Compressed Audio Technology for Time-lapse VCR"pp. 34–36, No. 29 (1990), IEEE Denshi Tokyo.

*Primary Examiner*—Andrew L. Sniezek

[57] ABSTRACT

A head arrangement and head offset are set so that the track pattern continuously recorded on a continuously running tape will be ordered in the sequence of recording when taken along the time dimension. In intermittent-feed still-speed recording, recording information is divided for recording, and the magnetic tape is fed momentarily by a distance equal to the tape amount recorded. In a helical scan magnetic recording and reproducing apparatus, intermittent still-speed recording is performed at prescribed intervals of time, and playback is performed with conditions that satisfy $|v| \leq r/N$ (N: positive integer, v: real number, r: positive real number) when the magnetic tape is played back at a speed v times as fast as normal playback speed and the rotary drum is rotated for playback at a speed r times as fast as recording speed. A digital playback head and an analog playback head are mounted on the same rotary drum, and the playback mode is automatically switched to play back a tape on which both analog and digital signals are recorded.

13 Claims, 40 Drawing Sheets

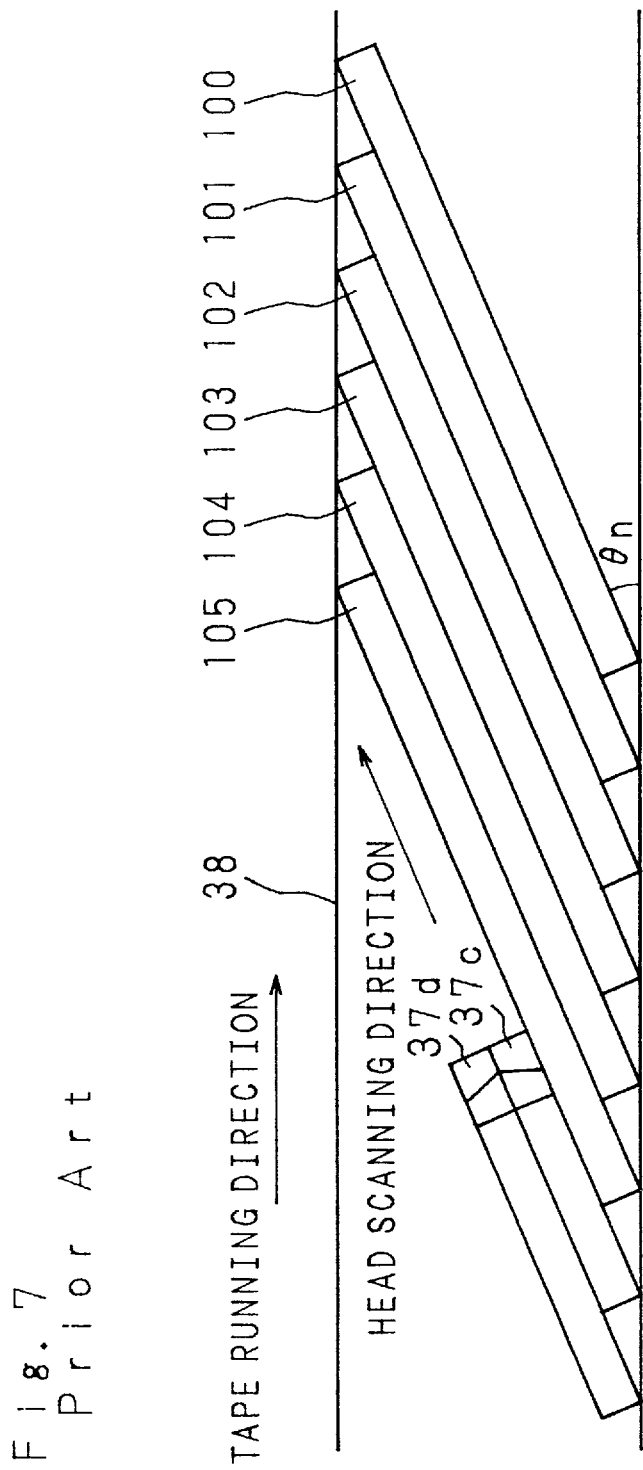

TAPE RUNNING DIRECTION

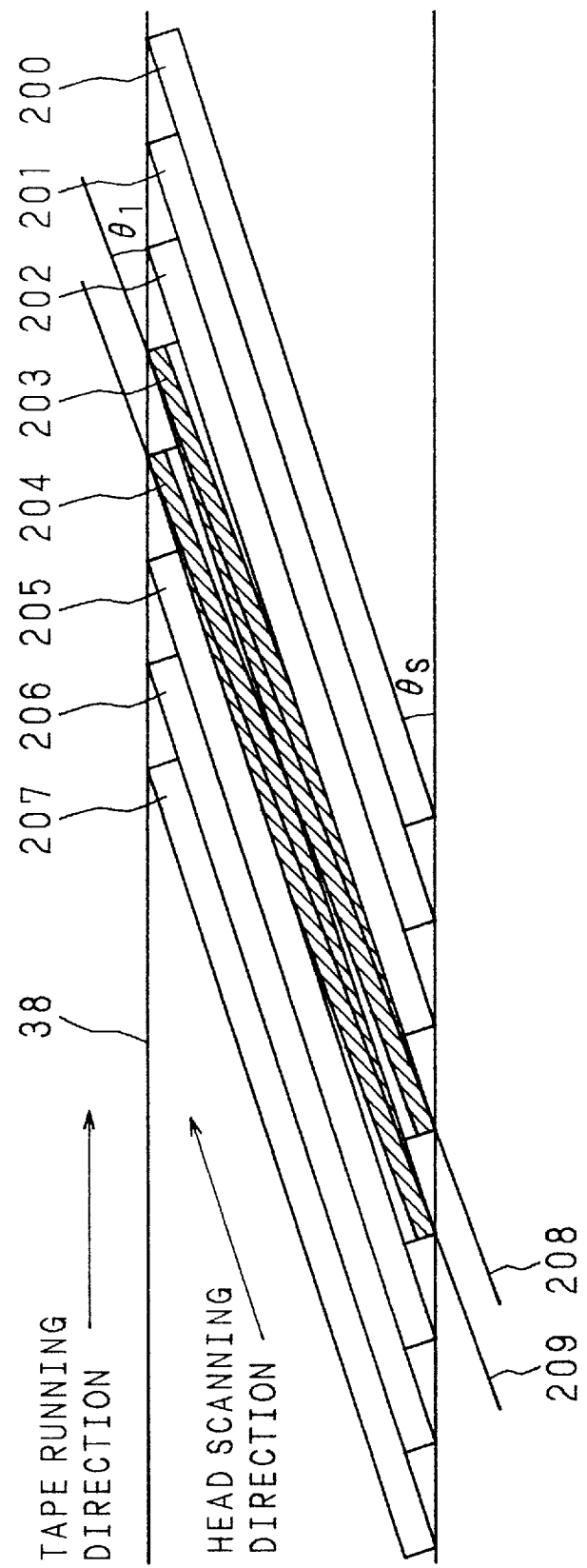

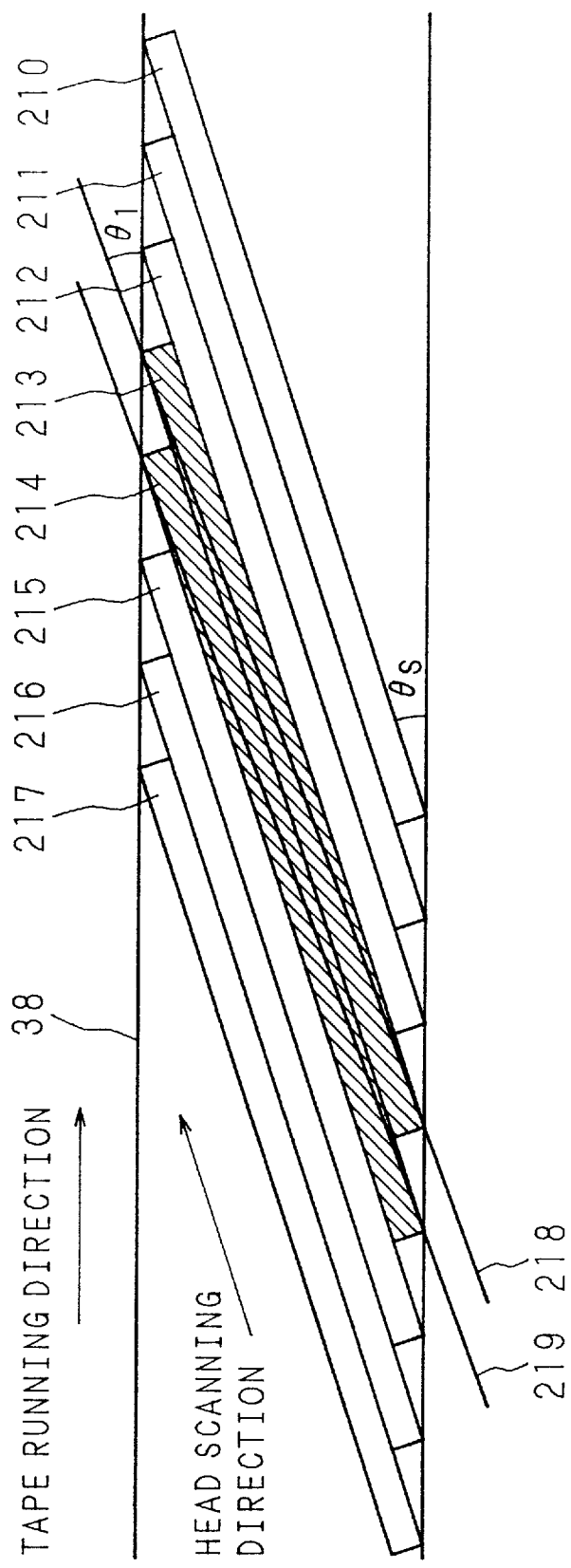

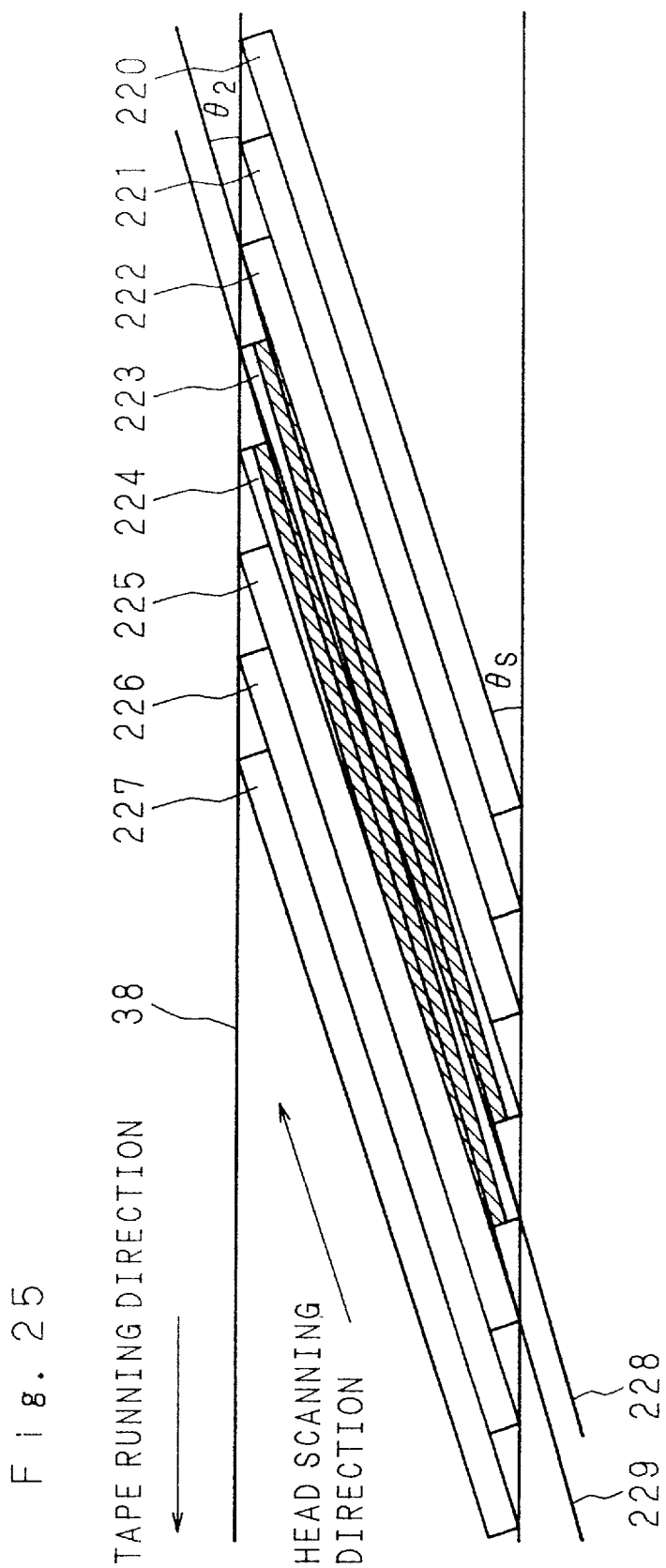

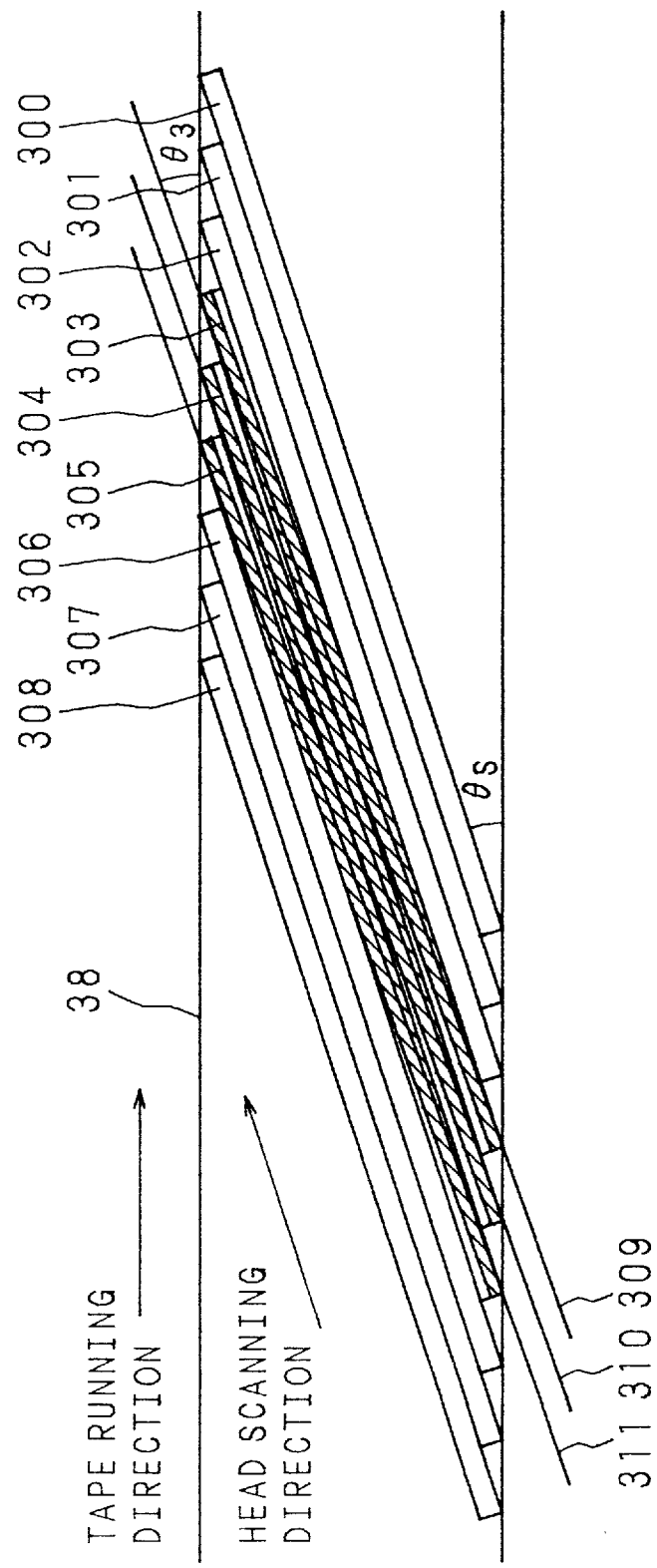

SYNTHESIS RESULT
FOR 1 TRACK

PORTION TO BE DECODED

ONE HORIZONTAL SYNCHRONOUS PERIOD Th

MAGNETIC HEAD REPLACEMENT STRUCTURE IN HELICAL SCAN MAGNETIC RECORDING AND REPRODUCING APPARATUS AND METHOD THEREOF

This application is a continuation of application Ser. No. 08/627,325, filed on Apr. 4, 1996, now abandoned, which was a continuation of Ser. No. 08/103,044 filed on Jul. 28, 1993, now abandoned.

BACKGROUND OF THE INVENTION

1. Field of the Invention

The present invention relates to a helical scan magnetic recording and reproducing apparatus and a signal reproducing apparatus capable of reproducing both analog and digital signals.

2. Description of Related Art

In a conventional digital magnetic recording and reproducing apparatus (hereinafter abbreviated DVTR) for recording and reproducing digital signals, data for one field is divided into several tracks for recording by multiple magnetic heads. In normal continuous recording mode, recording is carried out while the magnetic tape is being run continuously. On the other hand, in long-play recording mode, a reduced number of fields are recorded as compared to the 60 fields per second that the NTSC television signal produces. More specifically, in the long-play recording mode, the tape is fed intermittently, and when the tape comes to a stop and remains at rest, one-field information is recorded at a time as a plurality of tracks by means of a plurality of heads. This long-play recording mode is hereinafter referred to as intermittent-feed still-speed recording.

FIG. 1 is a drawing showing an arrangement for a three-channel, six-head drum. In the figure, the numeral 1 is a first-channel L azimuth head (1L head), 2 is a second-channel R azimuth head (2R head), and 3 is a third-channel L azimuth head (3L head). Likewise, the numeral 4 is a first-channel R azimuth head (1R head), 5 is a second-channel L azimuth head (2L head), and 6 is a third-channel R azimuth head. The numeral 7 designates a rotary drum. These magnetic heads are mounted 60 degrees apart on the rotary drum 7.

FIG. 2 shows the offset of the magnetic heads relative to each other. The first-, second-, and third-channel heads are mounted with an offset of 0 $\mu$m between the L and R azimuth heads. The offset between the first-channel heads and the second-channel heads is, for example, 19 $\mu$m when measured from bottom to bottom of the heads. Likewise, the offset between the second-channel heads and the third-channel heads is, for example, 19 $\mu$m. The offset between the first-channel heads and the third-channel heads is 38 $\mu$m. It is assumed here that the track width is 19 $\mu$m.

FIG. 3 shows a tape track pattern recorded by driving the rotary drum 7 in intermittent-feed still-speed recording mode. The numerals 11, 12, 13, 14, 15, and 16 indicate the patterns recorded by the 1L head 1, 2R head 2, 3L head 3, 1R head 4, 2L head 5, and 3R head 6, respectively. The numeral 8 indicates a magnetic tape.

The recording operation will be described below. In intermittent-feed still-speed recording, one-field image information (e.g., three tracks) is recorded on the magnetic tape 8 held at rest while the rotary drum 7 makes one revolution. After recording of each field, the tape is fed by a distance equal to the width of three tracks. As shown in FIG. 3, one-field image information is recorded by the first three heads, i.e. the 1L head 1, 2R head 2, and 3L head 3, and the next one-field information is recorded by the second three heads, i.e. the 1R head 4, 2L head 5, and 3R head 6.

FIG. 4 shows a tape track patterns recorded by driving the rotary drum 7 in continuous recording mode. In FIG. 4, the numerals 21, 22, 23, 24, 25, and 26 indicate the patterns recorded by the 1L head 1, 3R head 6, 2R head 2, 1R head 4, 3L head 3, and 2L head 5, respectively.

The following describes how continuous feed continuous recording is carried out by the rotary drum 7. First, the 1L head 1 starts recording on the magnetic tape 8, which is followed, with a delay of 60 degrees, by the 2R head 2. The continuous recording operation described here assumes the use of a running system that conforms, for example, to the VHS standard. The magnetic tape 8 runs a distance just enough to produce tracks of 116 $\mu$m in combined width while the rotary drum 7 makes one revolution. While the rotary drum 7 revolves 60 degrees, the magnetic tape 8 runs a distance just enough to record a track of about 19 $\mu$m width.

FIG. 5 shows the relationship between the positions at which the magnetic heads come into contact with the magnetic tape 8 for recording. Relative to the position at which the 1L head 1 comes into contact with the magnetic tape 8, the corresponding position for the 2R head 2 is offset in the direction opposite to the tape running direction by an amount equal to the sum of the head offset 19 $\mu$m and the tape running distance (19 $\mu$m track width). That is, the recording start position of the 2R head 2 is displaced relative to the position of the 1L head 1 by an amount equal to a total track width of 38 $\mu$m in the direction opposite to the running direction of the magnetic tape 8. Similarly, the recording start position of the 3L head 3 is displaced relative to the position of the 2R head 2 by an amount equal to the 38 $\mu$m track width in the direction opposite to the running direction of the magnetic tape 8. The recording start position of the 2L head 5 also is displaced relative to the position of the 1R head 4 by an amount equal to the 38 $\mu$m track width in the direction opposite to the running direction of the magnetic tape 8, and likewise, the recording start position of the 3R head 6 is displaced relative to the position of the 2L head 5 by an amount equal to the 38 $\mu$m track width in the direction opposite to the running direction of the magnetic tape 8. Furthermore, the 1R head 4, which is displaced by ½ revolution from the 1L head 1 on the rotary drum 7, has an offset of 0 $\mu$m relative to the 1L head 1, so that in FIG. 4 the recording track 24 by the 1R head 4 is formed with a delay equal to 58 $\mu$m with respect to the recording track 21 by the 1L head 1.

However, as shown in FIG. 2, the 1L head 1 is offset from the 3R head 6 by 38 $\mu$m in the direction opposite to the direction in which the 1L head 1 is offset from the 2R head 2. When the tape runs a distance equal to the track width of 19 $\mu$m, a displacement of 19 $\mu$m occurs in the running direction of the magnetic tape 8, the displacement being equal to the difference (19 $\mu$m) between the head offset amounts. That is, when the patterns recorded on the tape are viewed, the track pattern sequence is reversed between the 1L head 1 and the 3R head 6, as shown in FIG. 5. For a similar reason, the track pattern sequence is reversed between the 1R head 4 and the 3L head 3.

As described above, the sequence of the magnetic heads that record on the magnetic tape 8 is uniquely determined by the physical positions of the magnetic heads shown in FIG. 1 and the direction of the rotary drum rotation, the sequence being the 1L head 1, 2R head 2, 3L head 3, 1R head 4, 2L head 5, and 3R head 6 in this order. However, the sequence of the track patterns recorded on the magnetic tape 8 is in the order of the 1L head 1, 3R head 6, 2R head 2, 1R head 4, 3L head 3, and 2L head 5, as shown in FIG. 4; thus, the recording sequence taken along the time dimension does not agree with the sequence of the track patterns recorded on the magnetic tape 8. This means that the track pattern 21 by the 1L head 1 is written in the gap created between the track patterns 26 and 22 already written by the 2L head 5 and the 3R head 6 respectively, so that the track width of the track pattern 21 is therefore equal to the head width of the 1L head 1. For a similar reason, the head width of the 1R head 4 directly determines the track width of the track pattern 24.

Thus, according to the recording and tape running techniques of the prior art, as described above, the sequence of the track patterns recorded on the tape in long-play recording mode in which the tape is intermittently fed and held at rest for recording, is different from the sequence of the track patterns recorded in continuous recording mode in which the tracks are recorded while the tape is in motion. In continuous recording mode, the sequence of the track patterns written on the tape is different from the writing sequence of the magnetic head; some tracks are written between already written track patterns. The resulting problem is that, if the head width of the magnetic head that writes the new track is greater than the track width, or if there is a variation in head offset, the new track may overwrite the already written track patterns. Furthermore, it has not been possible with the prior art to make the head width greater than the track width in order to cope with the problem of track skew, etc.

For intermittent magnetic recording and reproducing apparatus designed for crime prevention or like purposes, not only long-hour recording is a condition but the capability to record a high-resolution image is also demanded. Multi-channel recording is one known method of realizing high-resolution image recording using conventional magnetic recording techniques. This method relies on the use of multiple channels to reduce the signal band per channel, making it possible to record wide band signals using conventional magnetic recording techniques.

To illustrate an example of the high-resolution image recording method, a conventional DVTR employing a two-channel recording method will be described below with reference to FIG. 6. The DVTR shown was cited as a prior art example in Japanese Patent Application Laid-Open No. 3-113804 (1991).

In FIG. 6, the reference numeral 39 designates a rotary drum on which record/playback magnetic heads 37a, 37b, 37c, and 37d are mounted. In the illustrated example, the magnetic head pair 37a, 37b are placed 180 degrees apart from the magnetic head pair 37c, 37d, as shown in FIG. 6(b). The magnetic heads 37a and 37b are placed adjacent to each other, and likewise, the magnetic heads 37c and 37d are placed adjacent to each other. The magnetic heads 37a and 37c have the same azimuth; likewise, the magnetic heads 37b and 37d have the same azimuth. The magnetic heads 37a and 37c have the reverse azimuth from that of the magnetic heads 37b and 37d to prevent crosstalk from adjacent tracks. In an alternative drum arrangement, the magnetic heads 37a, 37b, 37c, and 37d may be made as record-only heads, and playback-only magnetic heads may be mounted 90 degrees apart from the respective record-only magnetic heads. The reference numeral 38 designates a magnetic tape which is wrapped 180 degrees over the rotary drum 39.

FIG. 6(b) shows the height relationship between the magnetic heads 37a, 37b, 37c, and 37d. The magnetic heads 37a and 37c having the same azimuth are mounted at the same height, while the magnetic heads 37b and 37d having the reverse azimuth from that of the other two heads are offset from the magnetic heads 37a and 37c by an amount equal to the track pitch. In the example shown in FIG. 6, the head width is equal to the track pitch.

Referring now to FIG. 7, we will describe how digital information signals are recorded by the magnetic heads 37a, 37b, 37c, and 37d. In the DVTR of FIG. 6, digital video information for one field is, for example, divided by a channel encoder (not shown) into two digital video information blocks for recording. That is, digital video information for one field is divided into two channels and supplied to the magnetic heads 37a and 37b so that adjacent tracks 100 and 101 are recorded during ½ revolution of the rotary drum 39; likewise, digital video information for the next field is divided into two channels and supplied to the magnetic heads 37c and 37d so that adjacent tracks 102 and 103 are recorded during the next ½ revolution of the rotary drum 39. In FIG. 7, θn designates a track slanting angle which is the angle that each track makes with the lower edge of the magnetic tape 38 in normal record/playback mode.

The following describes the operation of the above DVTR in an intermittent recording mode. The following methods of intermittent recording are known which differ in the timing of recording digital video information. The magnetic tape is driven intermittently by a capstan (not shown) with a speed pattern of acceleration, constant speed, and deceleration, as represented by a trapezoidal pulse shown in FIG. 8(a). The speed pattern differs with the intermittent drive control method employed, A dotted line 106 indicates the magnetic tape speed in normal record/playback mode. Recording current is supplied to the magnetic head either immediately after the capstan motor has stopped (FIG. 8(b)) or when the speed has reached a maximum (FIG. 8(c)).

When intermittently recording field by field, in the case of the former "still-speed" recording the head offset between adjacent magnetic heads need only be set equal to the prescribed track pitch, and stringent control of the magnetic tape speed pattern is not demanded. On the other hand, in the latter recording method in which the recording is carried out while the tape is in motion, the tape speed pattern must be maintained at a constant pattern during recording; if the speed pattern is unstable, the track slanting angle varies, and the occurrence of track skew is unavoidable.

Therefore, the description given below is based on the recording method in which the recording is carried out immediately after the capstan motor has come to a stop after each stepping motion (this method is hereinafter referred to as intermittent still-speed recording).

FIG. 9 is a diagram for explaining the operation when the magnetic tape recorded in intermittent still-speed recording mode is continuously run for playback in normal playback mode. In FIG. 9, the numerals 110 to 117 indicate tracks recorded in intermittent still-speed recording mode, each track recorded with a track slanting angle θs. The numerals 118 and 119 show the loci that the centers of the scanning magnetic heads 37a, 37b or 37c, 37d describe in normal playback mode, each magnetic head scanning locus having a slanting angle θn. As is apparent from FIG. 9, the slanting angle θn of the scanning head locus in normal playback mode is greater than the slanting angle θs of each track recorded in intermittent still-speed recording mode, which means that only portions indicated by hatching in FIG. 9 are played back in normal playback mode. That is, the envelope of the reproduced wave exhibits a rhomboidal waveform. In portions where the envelope of the reproduced wave is constricted, since the amplitude of the reproduced signal is small, the reproduced signal cannot be reconstructed into the original signal in a digital signal reproduction processing section at a later stage, so that the reproduced image will become disturbed.

As described, in the prior art DVTR of the above construction, the slanting angle of each track recorded in intermittent still-speed recording mode is different from the slanting angle of the magnetic head scanning in normal playback mode; the prior art therefore has the problem that when an image recorded in intermittent still-speed recording mode is played back in normal playback mode, the output level of the signal reproduced from some portions of each track becomes so low that a proper image cannot be reproduced.

Normally, when digitally recording the video signal on a magnetic tape, one-field data is divided into a plurality of blocks each of which is then error-correction coded before recording. When playing back, error detection and correction is performed on the data on a block-by-block basis. If the number of errors is so large that the errors cannot be corrected, only error detection is performed, and previous data is output from the memory while disabling writing to the memory. In −1 to +1 slow-speed playback, since the slanting angle of the recorded tracks is different from the head scanning angle, playback scanning is performed across two or more tracks. As a result, data for two or more fields are mixed together during playback, thus disturbing the reproduced image.

An apparatus aimed at resolving this problem is disclosed in Japanese Patent Application Publication No. 4-42875 (1992). FIG. 10 is a diagram illustrating the configuration of this prior art apparatus. The reference numeral 51 is an error detection/correction circuit, 53 is a field memory array consisting of one-field memories 53a, 53b, . . . 53n, 54 is a field number/block number detection circuit, 55 is a data selector, 56 is a one-field memory, 57 is a control counter, and 58 is an error correction circuit.

Digital data is input to the error-detection/correction circuit 51 where error detection and correction is performed on each ECC (error-correction coded) block before being supplied to the field memory array 53. In slow-speed playback, since scanning is performed across a plurality of tracks, the field number and block number are detected for each block by the field number/block number detection circuit 54 when the playback data is written to the field memory array 53. In accordance with the result of the detection, the data are distributed among the one-field memories, 53a, 53b, . . . , 53n, each playback data being written to the one-field memory of the corresponding field number. The data selector 55 selects and outputs the contents of the field memories, 53a to 53n, in the order of the field numbers. The contents are then supplied to the one-field memory 56 and output as a playback signal. The data selector 55 is switched in synchronism with the speed of the magnetic tape. Each of the field memories, 53a, 53b, . . . , 53n, stores the data for the same track having the same field number; therefore, even when playback scanning is performed across a plurality of tracks, the image can be reproduced without disruption.

However, the above system requires not only the provision of two error-correction circuits, i.e. the error-detection/correction circuit 51 and the error-correction circuit 58, but also a plurality of field memories; thus, the prior art system has the problem that the hardware, as well as control circuitry, necessary only for special mode playback, becomes large in size.

Digital VTRs use special high-density recording tape which is different from conventional analog tape. Furthermore, the digital cassette is different in size and shape and is not compatible with the conventional analog cassette. The digital cassette that has compatibility with the analog cassette is the digital compact cassette (DCC) that has recently been introduced on the market as a digital player for recording and replaying music. FIG. 11 shows the structure of the DCC head and its adjacent area.

In the figure, the numeral 504 shows a head unit, 505 indicates digital track record/playback heads, 506 indicates analog track record/playback heads, 507 designates a tape sector for recording digital tracks, and 508 designates a tape sector for recording analog tracks. In the DCC system, in order to record and play back analog and digital signals recorded by different recording methods on the same size tape, the digital heads 505 are mounted on one half of the head unit 504, and the analog heads 506 on the other half, and the tape shown in FIG. 11 is divided into two sectors along the tape running direction, the upper sector A for recording digital signals and the lower sector B for recording analog signals. In reverse playback mode, the head unit is rotated, for example.

This technique, however, cannot be applied to VTRs which use rotary heads, and is not suitable for high-density recording.

SUMMARY OF THE INVENTION

It is an object of the invention to provide a magnetic recording and reproducing apparatus that can record tracks of optimum width, whether in continuous feed continuous recording or in intermittent-feed still-speed recording mode, or even when there exist head offset variations or the head width is larger than the track width.

It is another object of the invention to provide a magnetic recording and reproducing apparatus that is capable of faithfully reproducing images from a magnetic tape recorded in intermittent still-speed mode even when the tape is run continuously for playback.

It is a further object of the invention to provide a magnetic recording and reproducing apparatus that is capable of playing back recorded images in slow-speed mode using the hardware configuration that is substantially the same as that used for normal playback.

It is still another object of the invention to provide a signal reproduction method that allows replaying of both digital and analog tapes.

In a magnetic recording and reproducing apparatus according to a first invention, magnetic heads are arranged so that track patterns recorded in continuous feed continuous recording mode will be ordered in the sequence of recording when taken along the time dimension; in intermittent-feed still-speed recording, information to be recorded is divided for recording, and after each recording, the magnetic tape is fed by an amount equal to the recorded tape amount, thus recording field information.

In one preferred mode of the first invention, magnetic heads are arranged equally spaced apart on a rotary drum, and in intermittent-feed still-speed recording mode, tracks are recorded one at a time on a magnetic tape, the magnetic tape being fed momentarily after recording of one track. The magnetic head offset is so set that track patterns recorded in continuous feed continuous recording mode will be ordered in the sequence of recording when taken along the time dimension.

In another preferred mode of the first invention, groups of closely spaced magnetic heads and independent magnetic heads separately placed from the groups of magnetic heads are mounted on a rotary drum. When recording by the closely spaced magnetic heads, as many tracks as the channels of the closely spaced magnetic heads are recorded, and after recording, the tape is fed by an amount equal to the width of the recorded tracks; when recording by the independent heads, only one track is recorded, and the tape is fed by just one track.

In a magnetic recording and reproducing apparatus according to a second invention, when recording, intermittent still-speed recording is performed at prescribed intervals of time, and when playing back, the rotary drum is rotated at a speed r times ($r \geq N$) the recording speed, and the magnetic tape is continuously run at a speed +1 to −1 times the normal playback speed, thereby playing back information recorded on one track on the magnetic tape by at least one scan out of r scans made by a magnetic head. This allows recovery of almost all information recorded on the track and thus ensures reproduction of an image faithful to the original image.

In a magnetic recording and reproducing apparatus according to a third invention, when recording, intermittent still-speed recording is performed at prescribed intervals of time, and when playing back, the rotary drum is rotated at the same speed as when recording, and the magnetic tape is continuously run at a speed 1/v to −1/v times ($v \geq N$) the normal playback speed, thereby playing back information recorded on one track on the magnetic tape by at least one scan out of v scans made by a magnetic head. This allows recovery of almost all information recorded on the track and thus ensures reproduction of an image faithful to the original image.

In a magnetic recording and reproducing apparatus according to a fourth invention, when recording, intermittent still-speed recording is performed at prescribed intervals of time, and when playing back, playback is performed with conditions that satisfy $|v| \geq N/r$ (N: positive integer, v: real number, r: positive real number)

when the magnetic tape is run at a speed 1/v times the normal playback speed and the rotary drum is rotated at a speed r times the recording speed. This allows recovery of almost all information recorded on the track and thus ensures reproduction of an image faithful to the original image.

In a magnetic recording and reproducing apparatus according to a fifth invention, an ID number is appended to each C1 codeword, a part of an error-correcting code, and by reading the ID number, a write address is generated to store reproduced information in a memory, and the information to be played back is reassembled in the memory. Since information to be played back is written to the memory at the timing corresponding to the ID number, error correction need only be performed only once as in normal playback mode, and furthermore, there is no need to provide a plurality of field memories.

In a signal reproducing apparatus according to a sixth invention, a digital signal playback head and an analog signal playback head are mounted on the same drum, to play back both digital and analog signals. According to this invention, the presence or absence of a horizontal or vertical synchronizing signal carried in the analog signal is detected to determine whether the signal to be played back is digital or analog.

The above and further objects and features of the invention will more fully be apparent from the following detailed description with accompanying drawings.

BRIEF DESCRIPTION OF THE DRAWINGS

FIG. 7 is a track pattern diagram for explaining a normal mode recording method according to the prior art example.

FIG. 23 is a diagram showing an example of head scanning loci in continuous feed playback mode according to one embodiment of the invention.

FIG. 24 is a diagram showing an example of head scanning loci in continuous feed playback mode according to one embodiment of the invention.

FIG. 25 is a diagram showing an example of head scanning loci in continuous feed playback mode according to one embodiment of the invention.

FIG. 29 is a diagram showing an example of head scanning loci in continuous feed playback mode according to one embodiment of the invention.

DESCRIPTION OF THE PREFERRED EMBODIMENTS

The preferred embodiments of the present invention will now be described in detail below with reference to the accompanying drawings.

Embodiment 1 (1st Invention)

Figure 1:
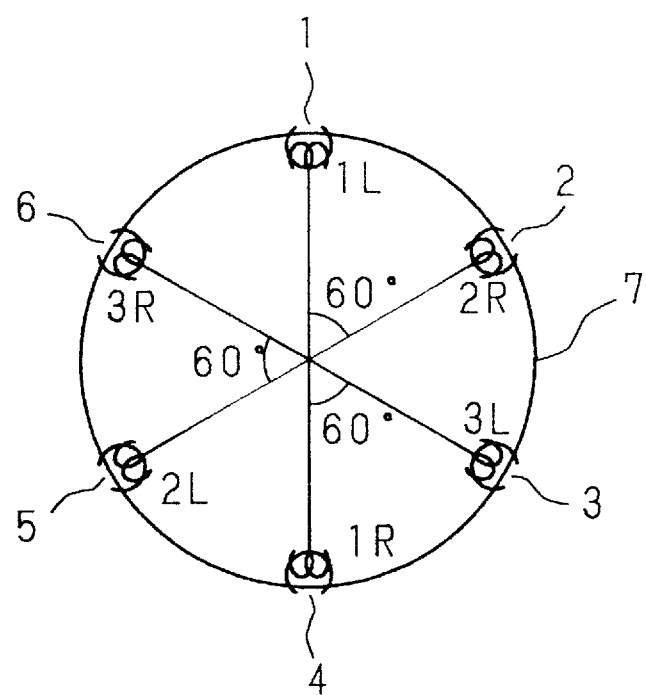
FIG. 1 is a diagram showing a magnetic head arrangement on a rotary drum according to a prior art example.
Figure 2:
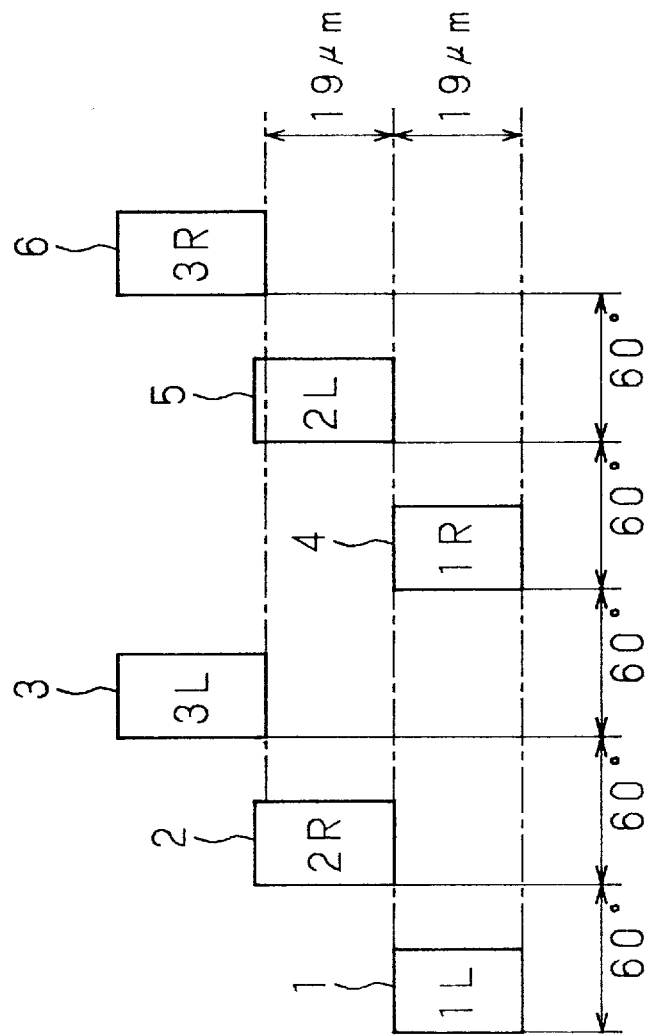
FIG. 2 is a diagram showing the magnetic head offset according to the prior art example.
Figure 3:
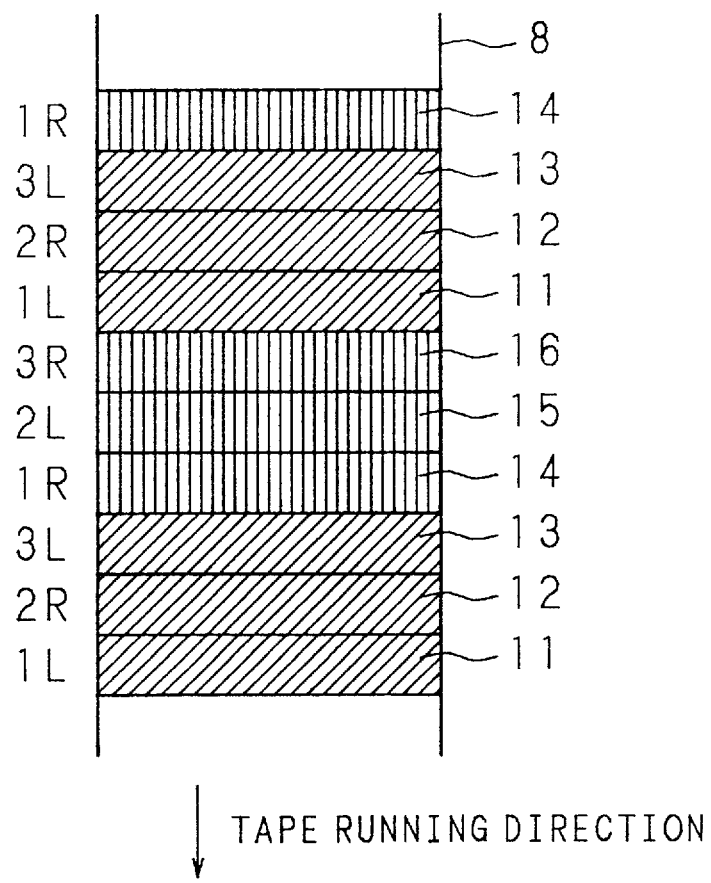
FIG. 3 is a diagram showing tape a track pattern recorded by a prior art intermittent-feed still-speed recording method.
Figure 4:
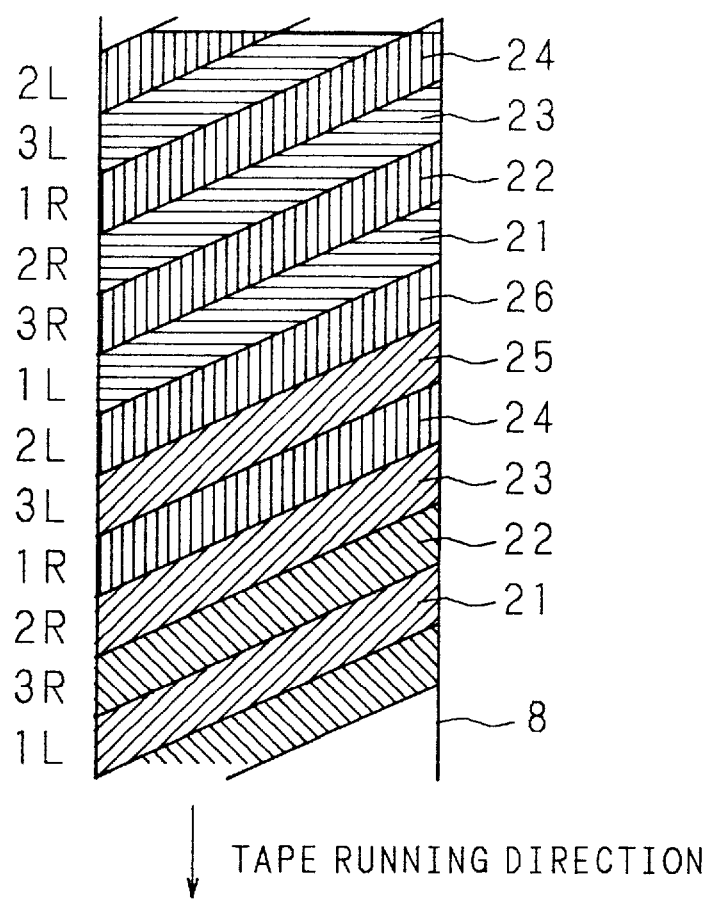
FIG. 4 is a diagram showing a tape track pattern recorded by a prior art continuous feed continuous recording method.
Figure 5:
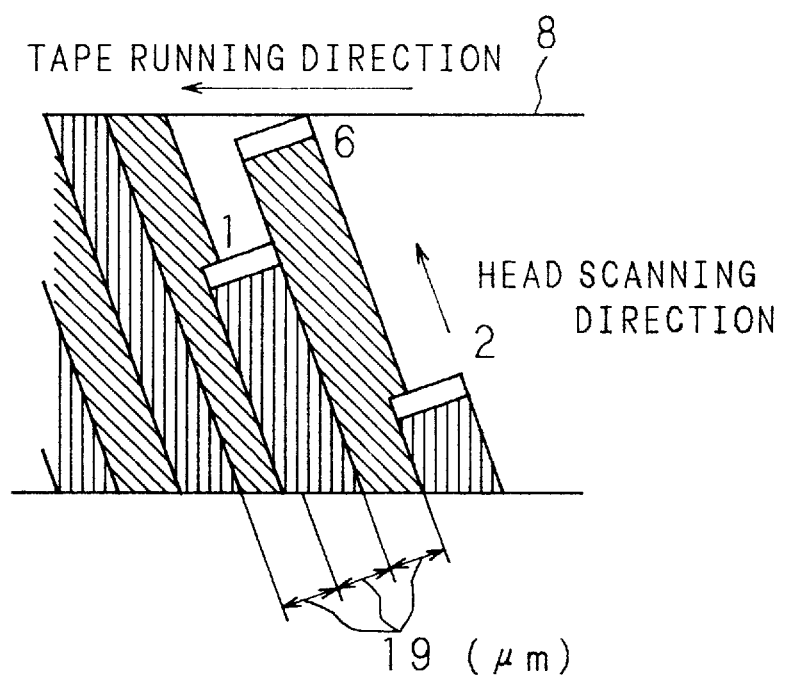
FIG. 5 is a diagram for explaining a process of recording tracks according to the prior art continuous feed continuous recording method.
Figure 12:
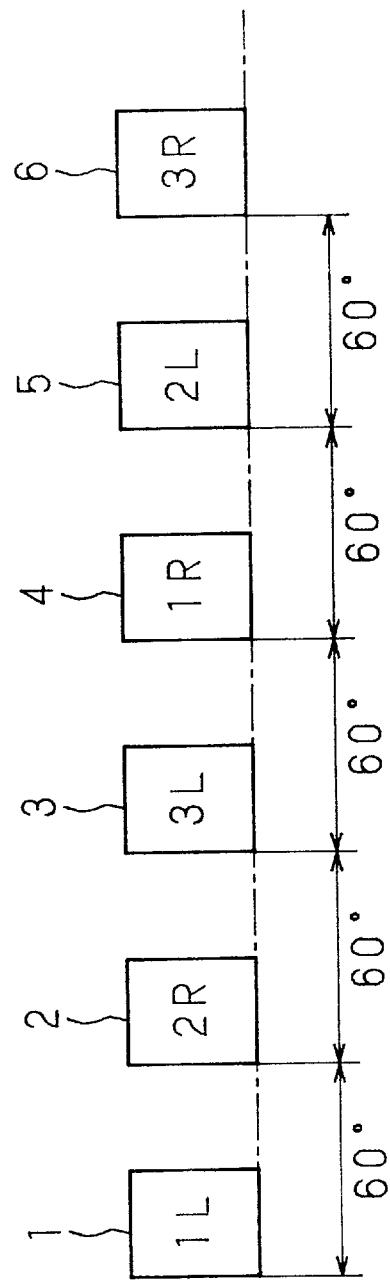
FIG. 12 is a diagram showing the magnetic head offset employed in one embodiment of the invention.
Figure 15:
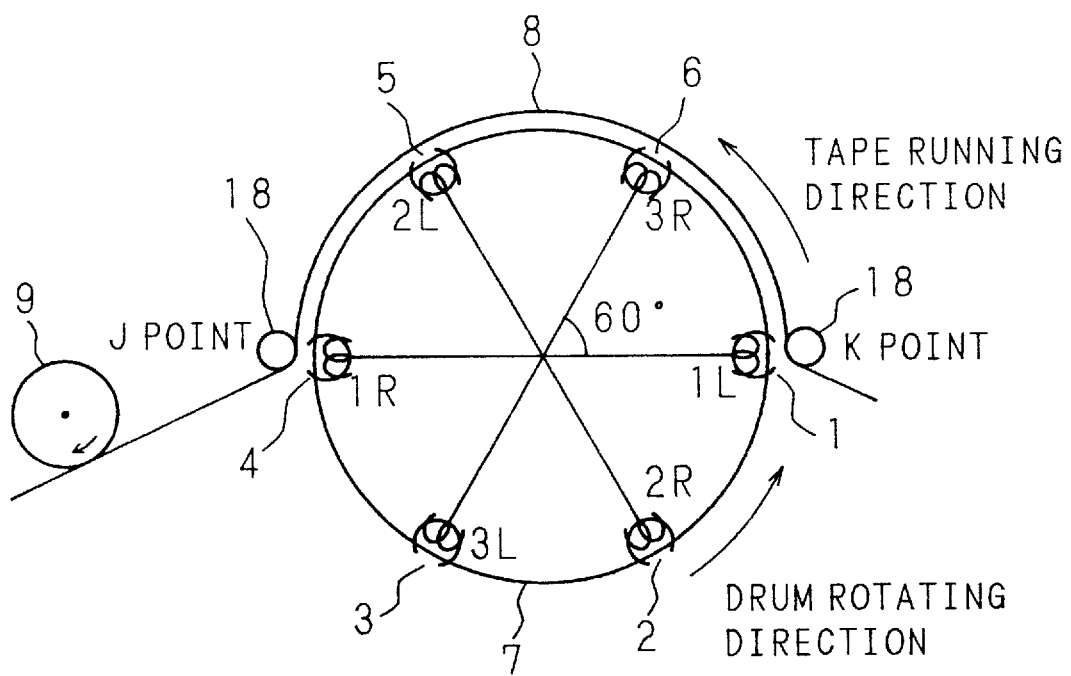
FIG. 15 is a diagram showing a head arrangement on a rotary drum according to one embodiment of the invention.

As shown in FIG. 15, the head arrangement on the rotary drum in this embodiment is the same as the prior art example shown in FIG. 1. FIG. 12 is a diagram showing the head offset on the rotary drum in Embodiment 1 of the invention. As shown, the 1L head 1, 2R head 2, 3L head 3, 1R head 4, 2L head 5, and 3R head 6 all have a head offset of 0 $\mu$m.

Figure 14:
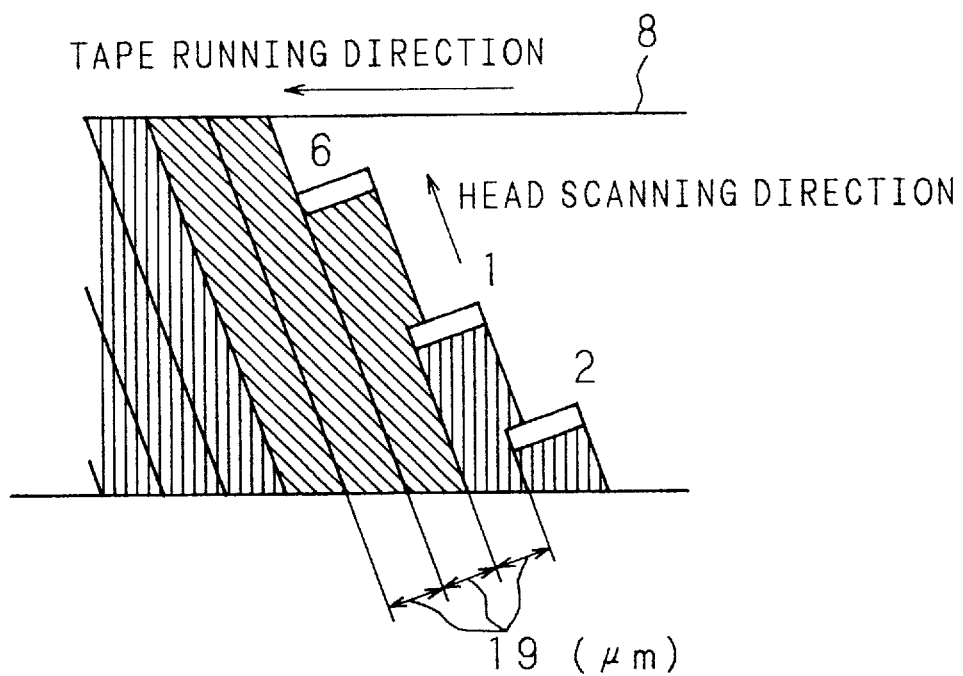
FIG. 14 is a diagram for explaining a process of continuous recording according to one embodiment of the invention.

Explanation will be given below on how continuous recording is carried out by the rotary drum of FIG. 1 with the head offset of FIG. 12. It is assumed here that the tape running system is made to the VHS standard. The magnetic tape runs a distance just enough to produce tracks of 116 $\mu$m in combined width while the rotary drum makes one revolution. While the rotary drum revolves 60 degrees, the magnetic tape runs a distance just enough to produce a track of about 19 $\mu$m width. The magnetic heads are mounted 60 degrees apart on the rotary drum, with a head offset of 0 $\mu$m as shown in FIG. 12. FIG. 14 is a diagram showing how recording tracks are being produced on the magnetic tape 8 by the rotary drum. For example, during the time interval between the moment the 3R head 6 comes into contact with the magnetic tape 8 and the moment the 1L head 1 comes into contact with the magnetic tape 8, the rotary drum revolves 60 degrees; during the same period, the magnetic tape 8 moves in the running direction by an amount equal to the 19 $\mu$m track width. As a result, the recording start position on the magnetic tape 8 of the 1L head 1 is displaced from that of the 3R head 6 by an amount equal to the 19 $\mu$m track width in the direction opposite to the running direction of the magnetic tape 8. Likewise, the 2R head 2, 3L head 3, 1R head 4, 2L head 5, and 3R head 6 start recording on the magnetic tape 8 with a displacement equal to the 19 $\mu$m track width relative to the 1L head 1, 2R head 2, 3L head 3, 1R head 4, and 2L head 5, respectively.

Figure 13:
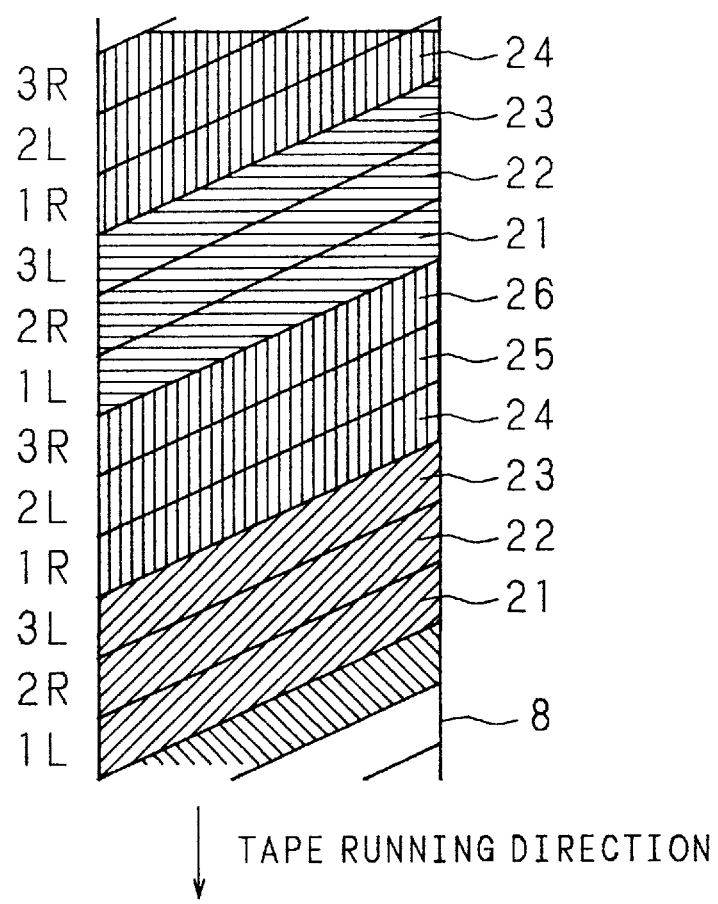
FIG. 13 is a diagram showing a tape track pattern recorded in continuous recording mode according to one embodiment of the invention.

FIG. 13 shows a tape track pattern thus produced. As shown, the track pattern produced on the magnetic tape 8 is in the order of 21, 22, 23, 24, 25, 26, 21, ..., which agrees with the recording sequence of the magnetic heads, i.e. the 1L head 1, 2R head 2, 3L head 3, 1R head 4, 2L head 5, and 3R head 6. Image information for one field is recorded over adjacent tracks.

Next, intermittent-feed still-speed recording will be explained. In the prior art, video signal information for one field is recorded simultaneously on three tracks. In Embodiment 1, on the other hand, one track is recorded at a time. In FIG. 15, the numeral 9 designates a capstan motor for driving the tape, and 18 indicates guide rollers for holding the tape within its running path. After the magnetic tape 8 is fed by one track width (19 $\mu$m) by the capstan motor 9, the magnetic tape 8 comes to a stop and is held at rest. When the 1L head 1 on the rotary drum 7 comes around to point K, recording starts; when the 1L head 1 comes to point J, the recording stops. Upon the recording being stopped, the capstan motor 9 moves the magnetic tape 8 by an amount equal to the 19 $\mu$m track width. After the magnetic tape 8 is stopped, recording is started again when the 2R head 2 comes to point K, and is stopped when it comes to point J. As soon as the 2R head 2 stops recording, the capstan motor 9 moves the magnetic tape 8 by an amount equal to the 19 $\mu$m track width. In like manner, recording is made by the 3L head 3, 1R head 4, 2L head 5, and 3R head 6 in this order.

Figure 16:
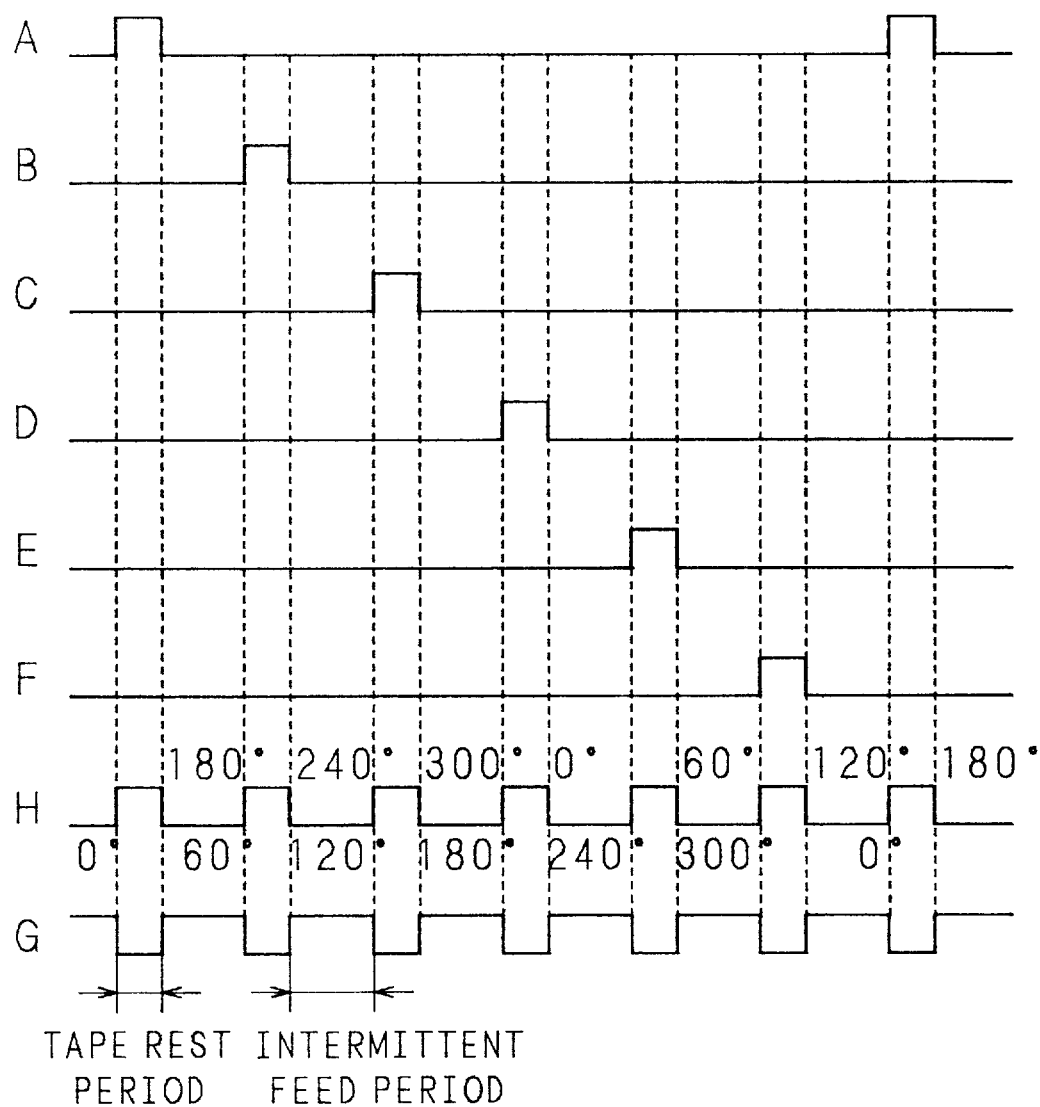
FIG. 16 is a diagram showing the recording timing of the magnetic heads according to one embodiment of the invention.

FIG. 16 shows the write timing of the magnetic heads along with tape feed timing. In FIG. 16, A designates the write timing of the 1L head 1 which writes only during a high level period. B designates the write timing of the 2R head 2 which also writes only during a high level period. Likewise, C designates the write timing of the 3L head 3, D for the 1R head 4, E for the 2L head 5, and F for the 3R head 6. G denotes the start timing of the capstan motor 9 for driving the magnetic tape 8; during a low level period, the magnetic tape is held at rest, and during a high level period, the capstan motor 9 is driven to move the magnetic tape 8 by a prescribed amount. H represents the timing in relation to the rotation angle of the rotary drum 7.

Here, the rotation angle of the rotary drum 7 is determined as 0 degree when the 1L head 1 is at point K in FIG. 15. As indicated by H in FIG. 16 that represents the rotation angle of the rotary drum 7, the rotary drum 7 is at the position of 0 degree when the 1L head 1 starts recording; by the time the recording is finished, the rotary drum 7 will have arrived at least at the position of 180 degrees. When the 2R head 2 starts recording, the rotary drum 7 is at the position of 60 degrees; the rotary drum 7 will have arrived at least at the position of 240 degrees by the time the recording is finished. In like manner, the rotary drum 7 revolves from the position of 120 degrees to the position of 300 degrees or more during the writing period of the 3L head 3, from the 180 degrees to the 360 (0) degrees position during the writing period of the 1R head 4, from the 240 degrees to the 60 degrees position during the writing period of the 2L head 5, and from the 300 degrees to the 120 degrees position during the writing period of the 3R head 6.

As described above, in intermittent-feed still-speed recording, each time one magnetic head has recorded one track, the magnetic tape is fed by one track; during each stationary period of the magnetic tape, only one track is recorded on the magnetic tape.

Figure 17:
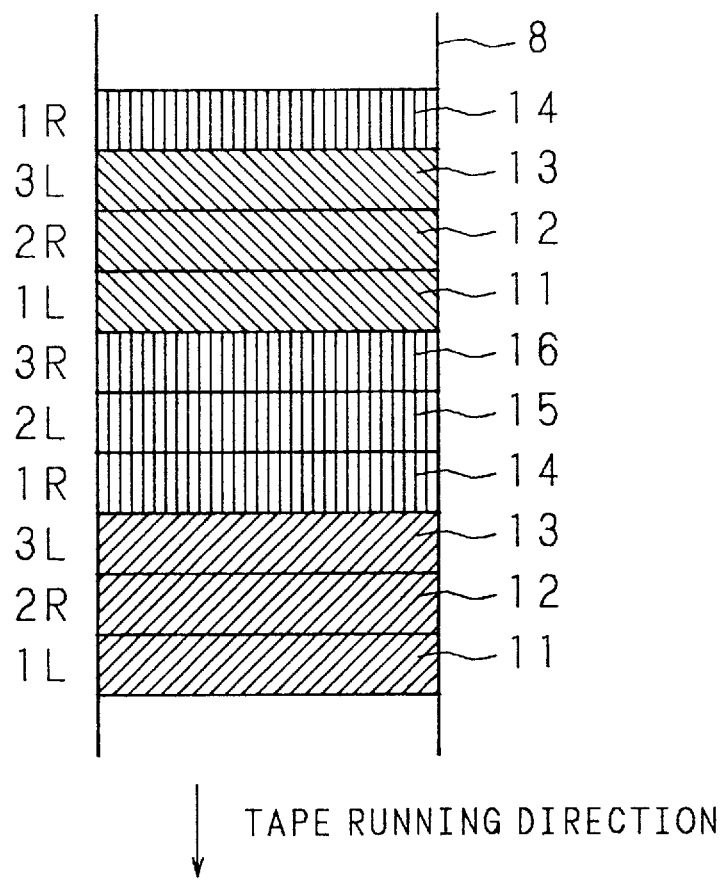
FIG. 17 is a diagram showing a tape track pattern recorded in intermittent-feed still-speed recording mode according to one embodiment of the invention.

FIG. 17 shows a track pattern produced on the tape by the above intermittent-feed still-speed recording method. As shown, the track pattern produced on the magnetic tape is in the order of 11, 12, 13, 14, 15, 16, 11, . . . . This shows that, as in the case of continuous recording, the sequence of the tracks written on the magnetic tape agrees with the sequence of the magnetic heads that record the tracks on the magnetic tape. The video signal for the same field is recorded over adjacent tracks.

Also, this video signal, for a prescribed period (e.g., one field), is divided into m channels (m is an integer not smaller than 2) and the divided signal is recorded over the adjacent tracks on the magnetic tape.

Embodiment 2 (1st Invention)

Figure 18:
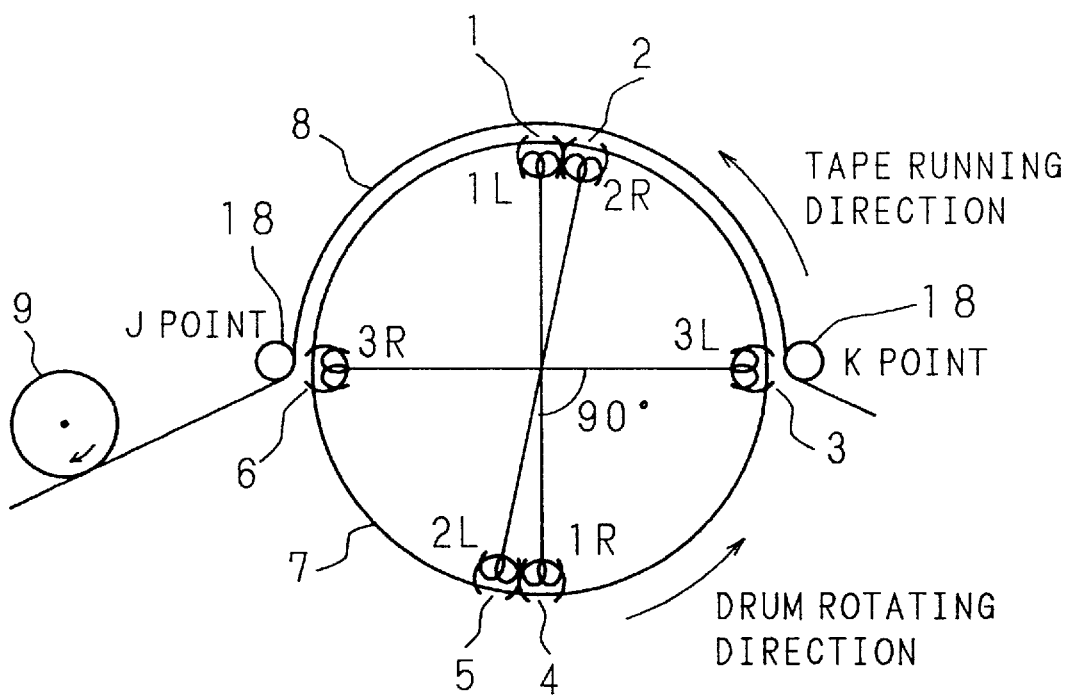
FIG. 18 is a diagram showing a head arrangement on a rotary drum according to one embodiment of the invention.

In Embodiment 1, the magnetic heads are placed at equal spacings on the rotary drum, but alternatively, the magnetic heads may be arranged as shown in FIG. 18. In FIG. 18, the 1L head 1 and the 2R head 2 are mounted adjacent to each other. Likewise, the 1R head 4 and the 2L head 5 are mounted adjacent to each other. The 3L head 3 is placed 90 degrees apart from the 1L head 1, while the 3R head 6 is mounted at a position 90 degrees apart from the 1R head 4. In FIG. 18, the reference numerals 9 and 18 designate the same capstan motor and guide rollers as shown in FIG. 15 (Embodiment 1).

Figure 19:
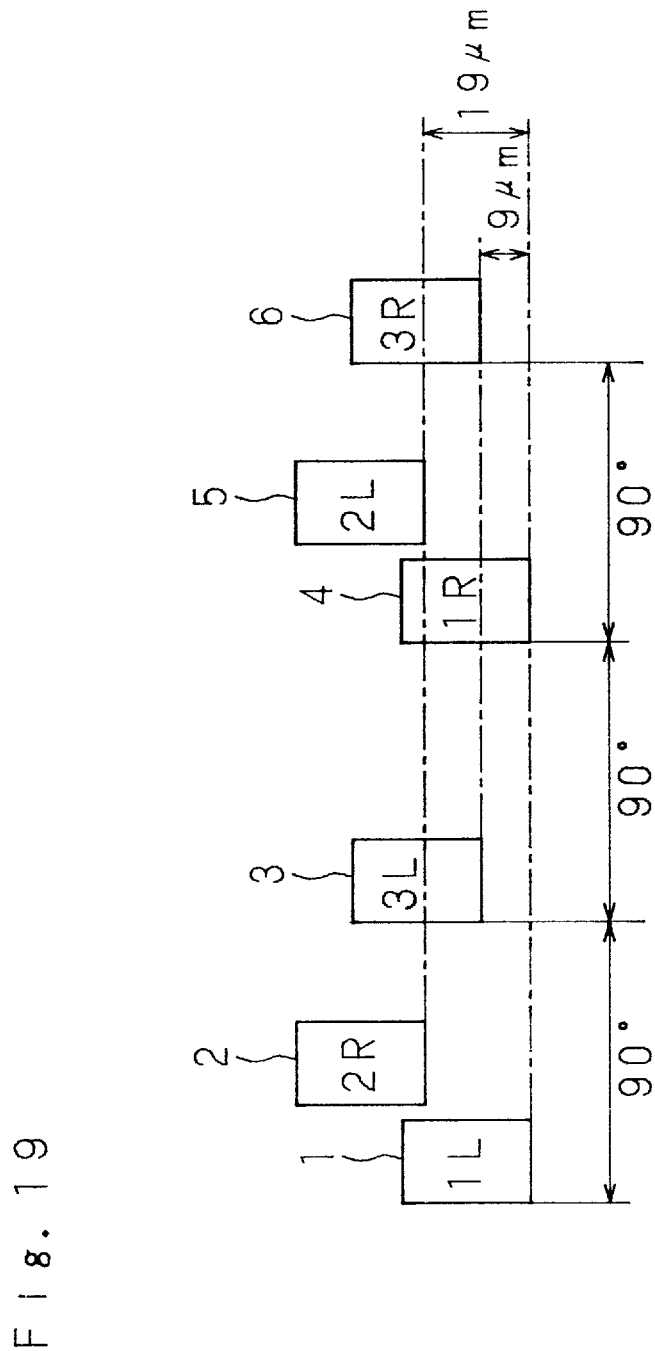
FIG. 19 is a diagram showing the magnetic head offset employed in one embodiment of the invention.

FIG. 19 shows the magnetic head offset employed in this embodiment. The 2R head 2 is mounted with its lower edge offset by 19 $\mu$m relative to the lower edge of the 1L head 1. The 3L head 3 is mounted with its lower edge offset by about 9 $\mu$m relative to the lower edge of the 1L head 1. Likewise, the 2L head 5 is mounted with an offset of 19 $\mu$m, and the 3R head 6 with an offset of about 9 $\mu$m, both relative to the 1R head 4. The offset between the 1L head 1 and the 1R head 4 is 0 $\mu$m.

Figure 20:
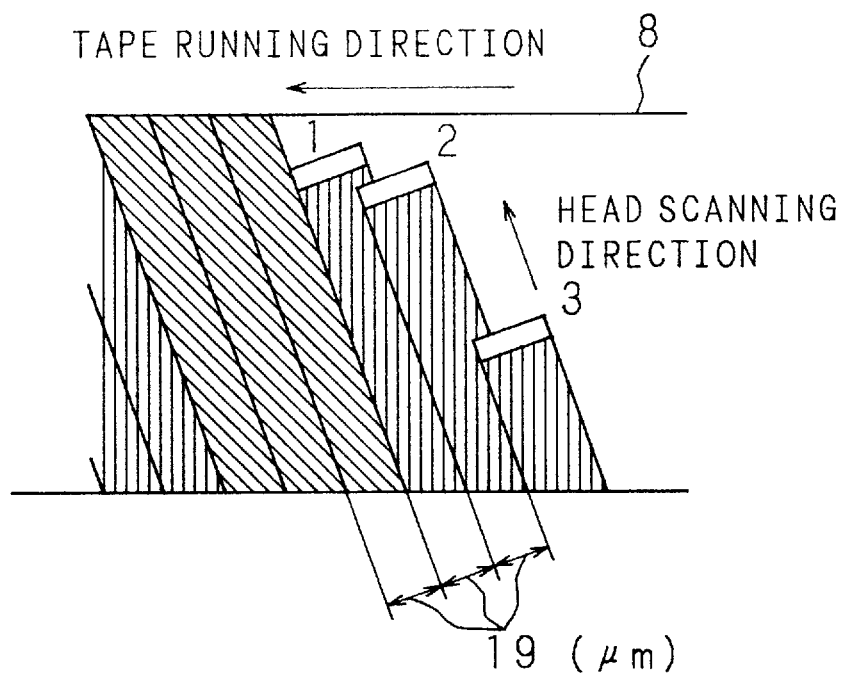
FIG. 20 is a diagram for explaining a process of continuous recording according to one embodiment of the invention.

Continuous tape feed continuous recording will be explained below. FIG. 20 shows how tracks are being recorded in continuous feed continuous recording mode. The 3L head 3 starts recording on the magnetic tape 8 with a delay of 90 degrees from the 1L head 1 in terms of the rotation angle of the rotary drum 7. In each revolution of the rotary drum 7, the magnetic tape 8 runs a distance equal to a combined track width of 116 $\mu$m. The magnetic tape 8 is fed over a distance approximately equal to a track width of 29 $\mu$m while the rotary drum 7 revolves 90 degrees. The 3L head 3 has a head offset of 9 $\mu$m relative to the 1L head 1. Therefore, the 3L head 3 arrives at the magnetic tape 8 with an offset equal to the sum of the magnetic tape feed distance and the head offset, relative to the 1L head 1. That is, the 3L head 1 starts recording at a position offset from the 1L head 1 by an amount equal to a combined track width of 38 $\mu$m in the direction opposite to the tape running direction. The 1R head 4 has a zero head offset relative to the 1L head 1, and therefore, arrives at the magnetic tape 8 with a delay of 180 degrees in terms of the revolution of the rotary drum 7. While the rotary drum 7 revolves 180 degrees, the magnetic tape 8 runs a distance equal to a combined track width of 58 $\mu$m. That is, the 1R head 4 starts recording on the tape at a position offset from the 1L head 1 by the 58 $\mu$m track width in the direction opposite to the tape running direction. The track pattern thus produced on the magnetic tape is identical to the tape track pattern produced in Embodiment 1 shown in FIG. 13.

Figure 21:
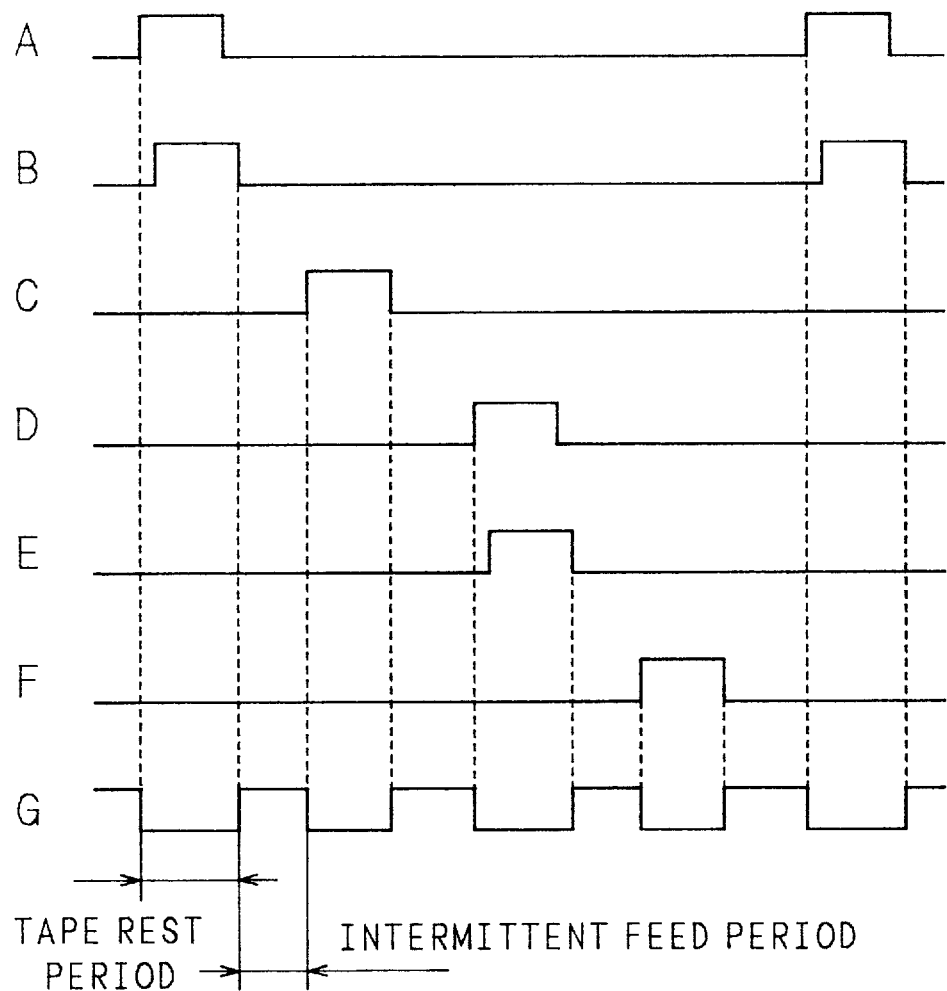
FIG. 21 is a diagram showing the recording timing of the magnetic heads according to one embodiment of the invention.

Next, intermittent-feed still-speed recording will be explained. FIG. 21 shows the write timing of the magnetic heads along with tape feed timing. In FIG. 21, A designates the write timing of the 1L head 1 which writes only during a high level period. B designates the write timing of the 2R head 2 which also writes during a high level period that occurs nearly coincidently with the write timing of the 1L head 1. Likewise, C designates the write timing of the 3L head 3, D for the 1R head 4, E for the 2L head 5, and F for the 3R head 6. G denotes the start timing of the capstan motor 9 for driving the tape; during a low level period, the magnetic tape is held at rest, and during a high level period, the capstan motor 9 is driven to move the tape by a prescribed amount.

The operation will now be explained. The 1L head 1 starts recording, which is immediately followed by the 2R head 2. The magnetic tape 8 is held at rest from the moment the 1L head 1 starts recording, until the 2R head 2 finishes recording. Upon completion of the recording by the 2R head 2, the magnetic tape 8 is fed by two tracks and then held at rest. With the magnetic tape 8 at rest, the 3L head 3 starts recording. Upon completion of the recording by the 3L head 3, the magnetic tape 8 is fed by one track and then held at rest. In like manner, the 1R head 4 and the 2L head 5 go into record, after which the magnetic tape 8 is fed by two tracks and then held at rest. After the 3R head 6 finishes recording, the magnetic tape 8 is fed by one track and then held at rest. The track pattern thus produced on the magnetic tape is shown in FIG. 17. As shown, the pattern is identical to the tape pattern produced in Embodiment 1. The sequence of the recording tracks written on the magnetic tape 8 agrees with the sequence of the magnetic heads that produce the track patterns on the magnetic tape 8. The video signal for the same field is recorded over adjacent tracks.

In Embodiment 2, magnetic head pairs each consisting of closed spaced heads are arranged in conjunction with independent magnetic heads, but it will be recognized that Embodiment 2 is also applicable to a head arrangement in which the 3L head 3 and the 3R head 6 are eliminated.

As described, according to Embodiments 1 and 2, the head arrangement and head offset are so set that the sequence of the track pattern written on the magnetic tape, whether in intermittent-feed still-speed recording or in continuous feed continuous recording, agrees with the time sequence in which the tracks are written on the tape by the magnetic heads; furthermore, in the case of intermittent-feed still-speed recording, image information for one field or one frame is divided into a plurality of tracks for recording on the magnetic tape, and the magnetic tape is fed by a distance over which each recording has been made. This construction not only help achieve highly accurate track width but provides freedom in head width setting, etc. so that information can be accurately reproduced during playback even if the track is skewed.

Embodiment 3 (2nd Invention)

Figure 22:
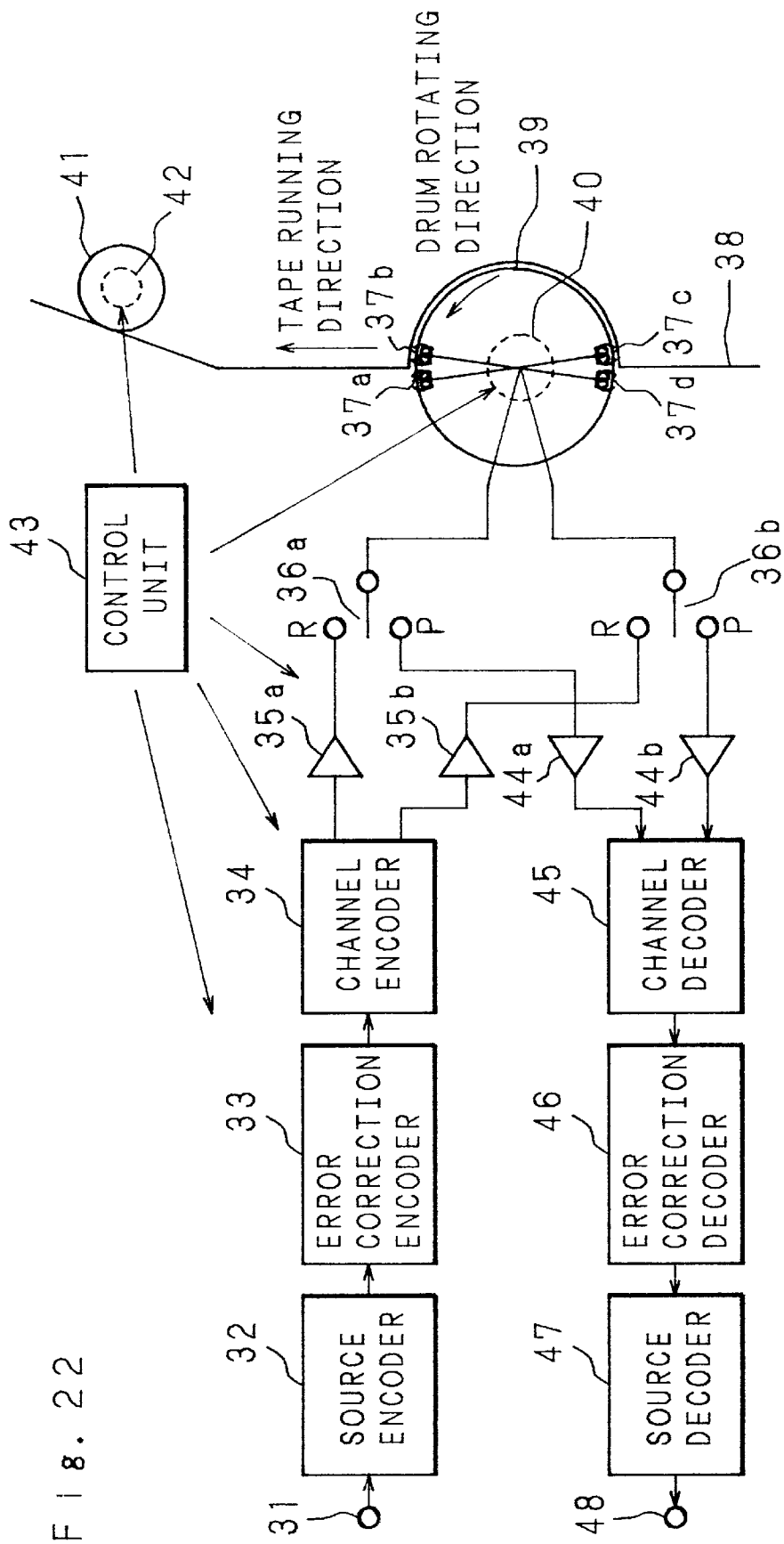
FIG. 22 is a block diagram showing the configuration of a magnetic recording and reproducing apparatus according to one embodiment of the invention.

FIG. 22 is a block diagram showing the configuration of a two-channel recording DVTR according to Embodiment 3 of the invention. In FIG. 22, the reference numeral 31 is an input terminal; 32 is a source encoder; 33 is an error correction encoder; 34 is a channel encoder; 35a and 35b are recording amplifiers; 36a and 36b are record/playback select switches; 37a, 37b, 37c, and 37d are magnetic heads; 38 is a magnetic tape; 39 is a rotary drum; 40 is a drum motor; 41 is a capstan; 42 is a capstan motor; 43 is a control unit for controlling the digital signal processor, drum motor 40, and capstan motor 42; 44a and 44b are head amplifiers; 45 is a channel decoder; 46 is an error correction decoder; 47 is a source decoder; and 48 is an output terminal. In the figure, the numerals 37a, 37b, 37c, 37d, 38, and 39 designate the same parts as those described in the prior art example shown in FIG. 6.

The operation of the above DVTR will be described below. First, the analog video signal to be recorded is applied to the source encoder 32 through the input terminal 31. The source encoder 32 converts the analog video signal into digital form, performs processing such as high-efficiency encoding, and supplies the result to the error correction encoder 33. The error correction encoder 33 encodes the signal so that any errors caused in the signal can be corrected when playing back, and supplies the encoded result to the channel encoder 34. The channel encoder 34 divides the supplied data train into two channels, modulates it, and encodes it using a code, such as NRZI or a block code, that matches the transmission characteristics of the magnetic tape and magnetic head system. The outputs of the channel encoder 34 are passed through the recording amplifiers 35a and 35b and supplied to the magnetic heads through the record/playback select switches 36a and 36b; the output passed through the select switch 36a is supplied to the magnetic heads 37a and 37c, and the output passed through the select switch 36b is supplied to the magnetic heads 37b and 37d.

The control unit 43 controls the rotation of the rotary drum 39 and the running speed of the magnetic tape 38 through control of the drum motor 40 and the capstan motor 42. When recording in continuous record mode, a signal signifying the selection of the continuous record mode is given to the control unit 43; the control unit 43 then generates various clock pulses and control signals by which the drum motor 40 is controlled to run stably at a prescribed speed, for example, at the frame frequency of the luminance signal, the capstan motor 42 is controlled to run at a prescribed speed to feed the magnetic tape 38 at a constant prescribed speed by means of the capstan 41 and pinch roller (not shown), and the video signal processing circuit is controlled to apply recording current to the magnetic heads 37a, 37b, 37c, and 37d at prescribed recording timing.

Figure 8A:
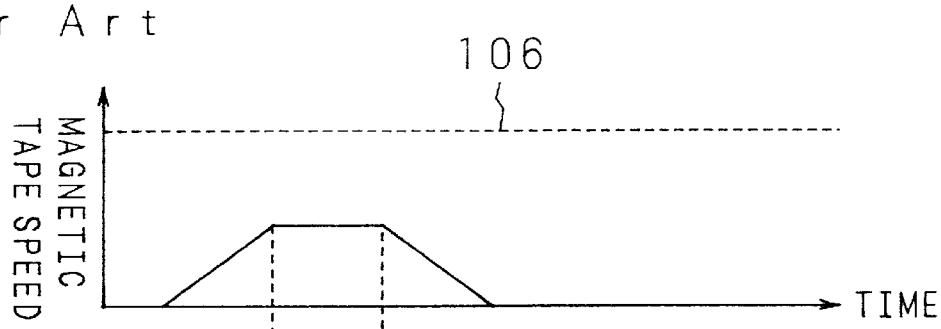
FIGS. 8(a), (b), and (c) are diagrams for explaining the timing of intermittent recording.
Figure 8B:
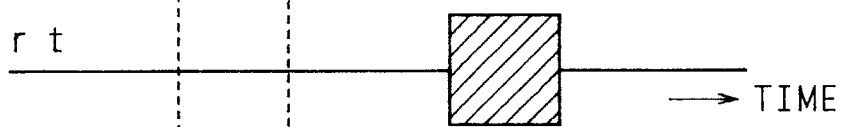
Figure 8C:
Figure 9:
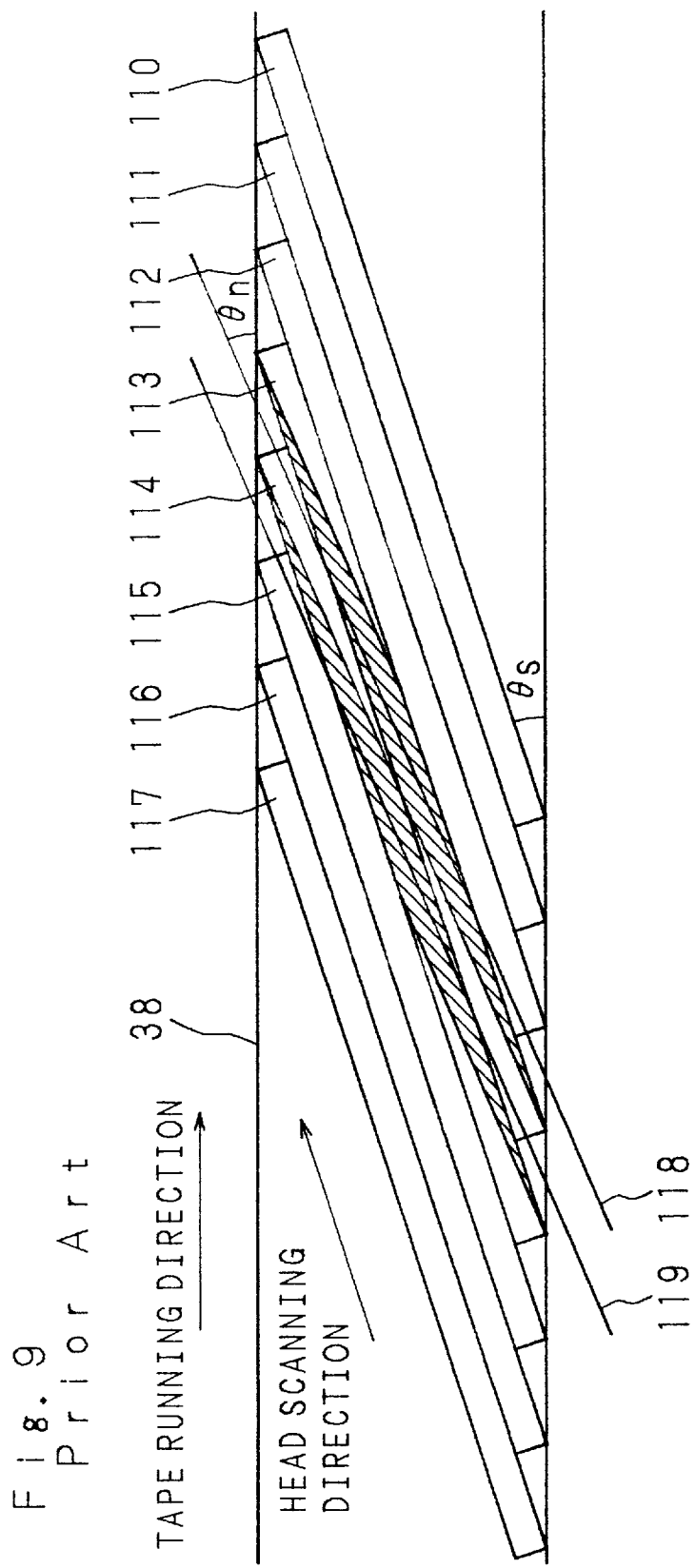
FIG. 9 is a diagram showing an example of head scanning loci in continuous feed playback mode according to the prior art example.
Figure 10:
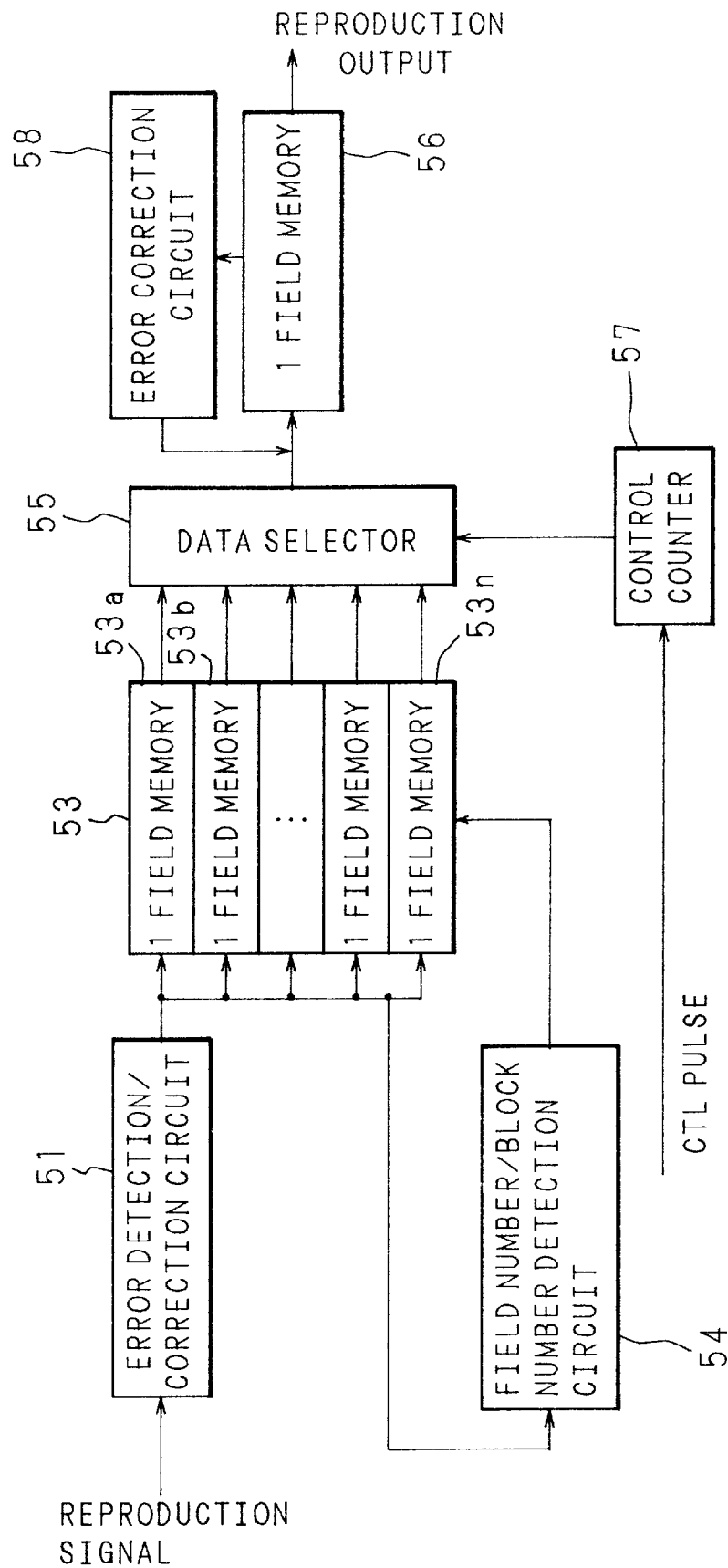
FIG. 10 is a block diagram showing the configuration of a prior art magnetic recording and reproducing apparatus.
Figure 11:
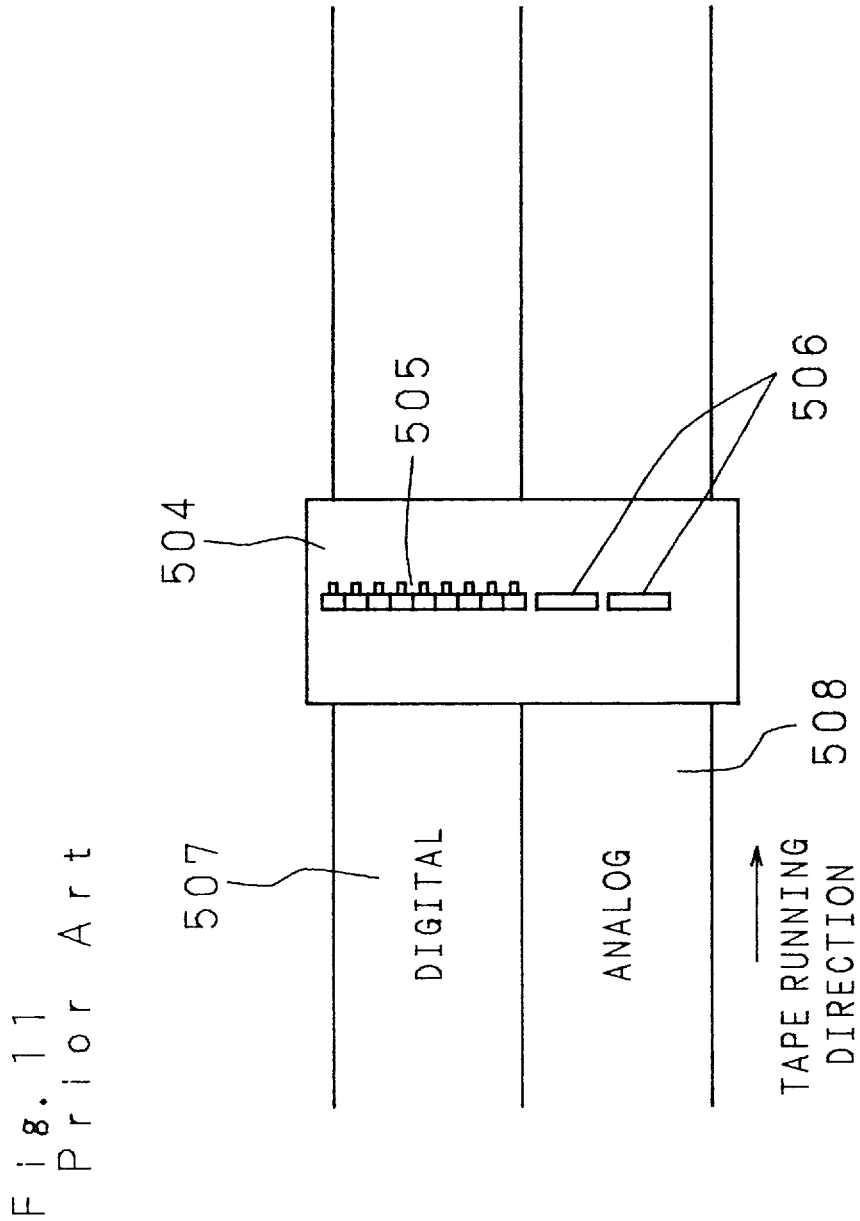
FIG. 11 is a diagram showing the structure of the prior art DCC head.

On the other hand, when recording in intermittent record mode, a signal signifying the selection of the intermittent record mode is given to the control unit 43; the control unit 43 then generates various clock pulses and control signals by which the drum motor 40 is controlled to run stably at a prescribed speed, for example, at the frame frequency of the luminance signal, the capstan motor 42 is controlled to run intermittently to feed the magnetic tape by means of the capstan 41 and pinch roller (not shown) with a speed pattern of acceleration, constant speed, and deceleration, as shown in FIG. 8(a), and the video signal processing circuit is controlled to apply recording current to the magnetic heads 37a, 37b, 37c, and 37d at prescribed recording timing. These control operations are the same as those performed in the prior art example described in Japanese Patent Application Laid-Open No. 3-113804 (1991).

When playing back, signals recorded on the magnetic tape 38 are reproduced by means of the magnetic heads 37a, 37b, 37c, and 37d, and supplied to the channel decoder 45 through the record/playback select switches 36a, 36b and the head amplifiers 44a, 44b. The channel decoder 45 performs the reverse conversion of the channel encoder 34. If no errors occur in the process of reproduction, the output of the channel decoder 45 represents the input data to the channel encoder 34. The output of the channel decoder 45 is supplied to the error correction decoder 46 for error correction. The output of the error correction decoder 46 is applied to the source decoder 47 which performs the reverse conversion of the source encoder 32 to reconvert the signal to the analog signal which is output at the output terminal 48 as the video signal.

In the example described hereinafter, during playback the drum is rotated at a speed two times as fast as the drum speed during recording.

In the DVTR of the present embodiment, video information for one field is recorded as two tracks with different azimuth angles in every ½ revolution of the rotary drum 39. In continuous recording mode, video information for two fields is recorded continuously as four tracks while the rotary drum 39 makes one revolution. In intermittent recording mode, the magnetic tape 38 is momentarily fed by a prescribed amount, and then held at rest while video information for one field is recorded; after a prescribed time, the magnetic tape 38 is again fed momentarily, followed by recording of video information for the next field. This feed and stop cycle is repeated. This technique is exactly the same as that employed in the prior art example described in Japanese Patent Application Laid-Open No. 3-113804 (1991).

FIG. 23 shows the loci that the magnetic heads describe when the magnetic tape 38 recorded in the above intermittent still-speed recording mode is played back at the same tape speed as in the normal playback mode while rotating the rotary drum 39 at a speed two times the recording speed. In FIG. 23, the numerals 200 to 207 indicate the tracks recorded in intermitted still-speed recording mode, each track having a slanting angle of θs. The numerals 208 and 209 indicate the scanning loci of the magnetic heads 37a, 37b or 37c, 37d, the slanting angle being θ1. When the head width for playback is set equal to the track pitch, if the playback tracking is so set as to describe the loci indicated at 208 and 209 in FIG. 23, the shaded portions in the recording tracks 203 and 204 are played back by the magnetic heads. As can be seen from FIG. 23, information equivalent to at least one-half the track width can be played back while each magnetic head makes at least one scan.

In this embodiment, since the magnetic heads scan the recording tracks at an angle, complete playback signals may not be obtained from the recording tracks, and the envelope of the playback signal may be constricted. If this happens, the signal-to-noise ratio of the playback signal at the constricted portions will degrade as a matter of course. If the signal-to-noise ratio degrades, whether the original signal can be reconstructed by the error correction decoder 46 in the digital signal processor at a later stage depends significantly on the error-correction capability of the error correction decoder 46.

For example, in "Collection of Papers from 1991 Kyushu Branch Meeting of the Japan Society of Electric and Related Technology", p. 158, it is reported that in the case of a DVTR using a product code of a C1 (241, 225, 17) RS code and a C2 (116, 108, 9) RS code as an error-correcting code, the probability of correctly reconstructing the original signal when played back at twice the normal speed is approximately 90% or over. The amount of information played back at twice the normal speed in this case is approximately equal to the amount of information played back by the magnetic heads shown in FIG. 23. It will be understood, therefore, that if the above error-correcting code is employed in this embodiment, the probability of correctly reconstructing the original signal is approximately 90% or over. This means that almost all the original video information can be restored.

In this embodiment, since the head width is set equal to the track pitch, only the shaded portions shown in FIG. 23 can be played back. However, if the head width is set approximately equal to twice the track pitch, all the information on one track can be played back while the magnetic head makes at least one scan, as shown in FIG. 24. The original video signal can then be reconstructed. In this case, however, the offset between adjacent magnetic heads need to be set equal to the track pitch. It is also clear that an error-correcting code having a lower error-correcting capability than the above error-correcting code may be used in this case.

FIG. 25 shows the loci that the magnetic heads describe when the magnetic tape 38 recorded in intermittent still-speed mode is played back in reverse direction with the rotary drum 39 being rotated at twice the recording speed. In FIG. 25, the reference numerals 220 to 227 indicate the tracks recorded in intermittent still-speed mode, each track having a slanting angle of θs. The numerals 228 and 229 indicate the scanning loci of the magnetic heads 37a, 37b or 37c, 37d, the slanting angle being θ2. When the head width for playback is set equal to the track pitch, if the playback tracking is so set as to describe the loci indicated at 228 and 229 in FIG. 25, the shaded portions in the recording tracks 223 and 224 can be played back by the magnetic heads. As can be seen from FIG. 25, information equivalent to at least one-half the track width can be played back while each magnetic head makes at least one scan. When the head width is set approximately equal to twice the track pitch, as described above, all the information on one track can be played back while the magnetic head makes at least one scan; the original video signal can then be reconstructed.

In the above example, the magnetic tape speed during playback is specifically set at +1 or −1 times the normal playback speed, but it will be appreciated that the embodiment is also effective if the tape is played back at any speed between +1 and −1 times the normal playback speed. This will be easily understood from the fact that the difference between the track angle θs in intermittent still-speed recording and the track angle θp in such playback becomes smaller than the difference between the track angle θs and the track angle θ1 in normal playback or θ2 in reverse playback in the above example, so that the track angle θp becomes closer to θs.

Figure 6A:
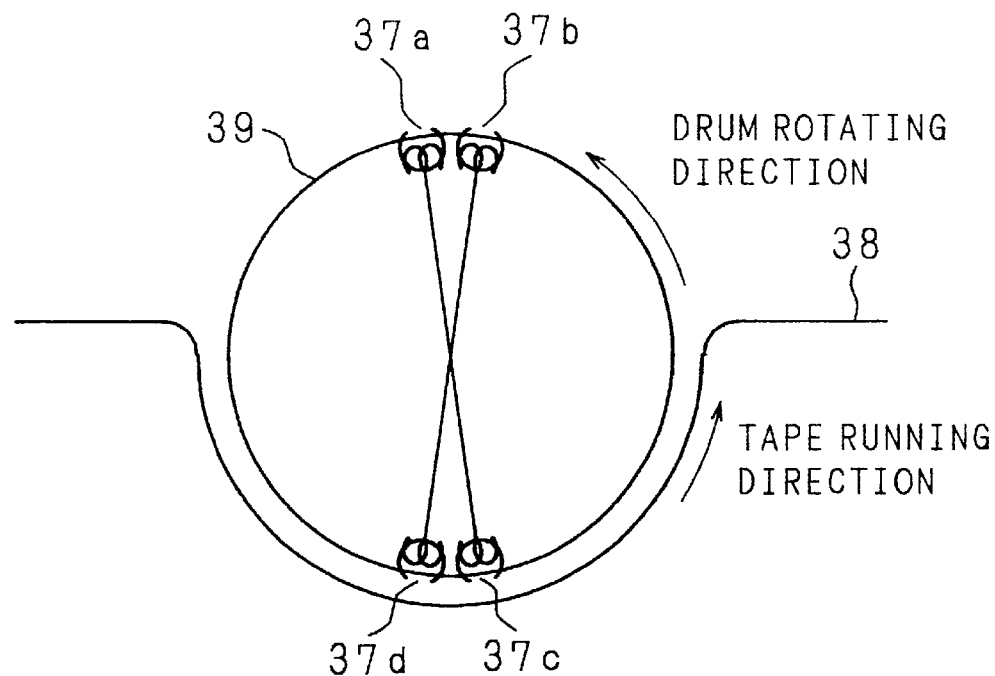
FIG. 6(a) is a diagram showing a magnetic head arrangement on a rotary drum according to a prior art example.
Figure 6B:
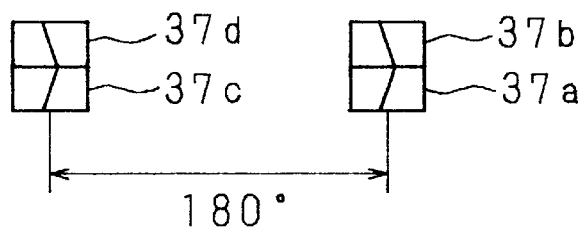
FIG. 6(b) is a diagram showing the height relationship between the magnetic heads on the rotary drum according to the prior art example.
Figure 26A:
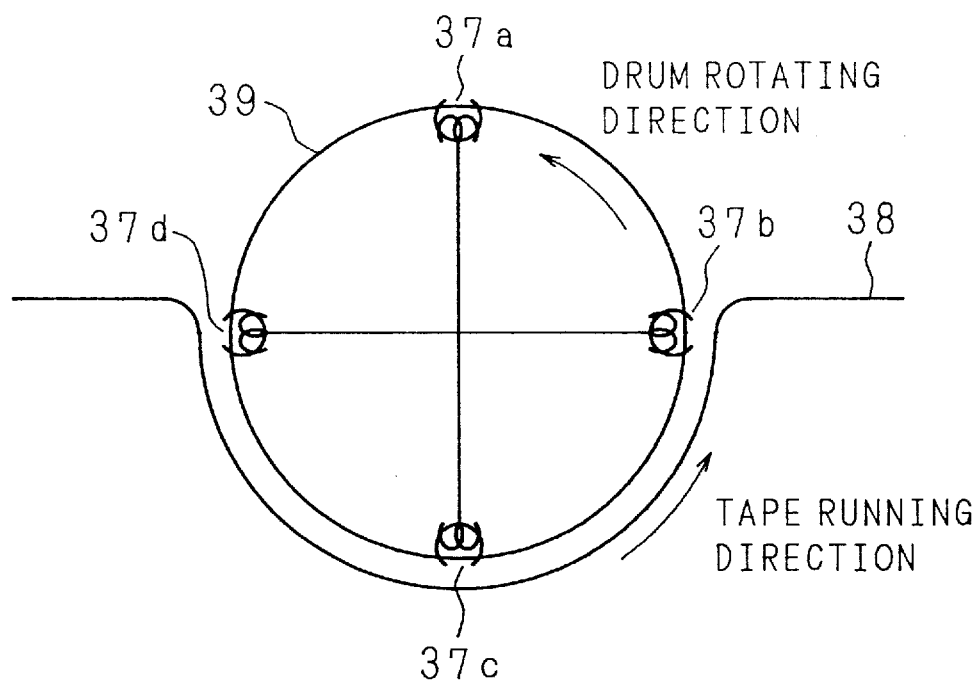
FIG. 26(a) is a diagram showing a magnetic head arrangement on a rotary drum according to one embodiment of the invention.
Figure 26B:
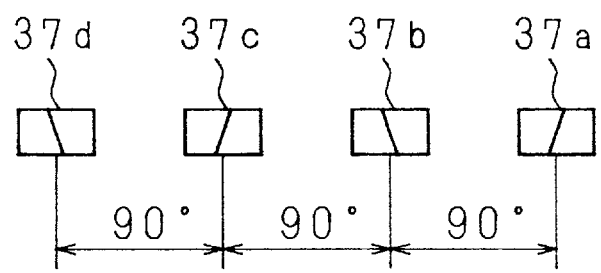
FIG. 26(b) is a diagram showing the height relationship between the magnetic heads on the rotary drum according to one embodiment of the invention.

Furthermore, in the above embodiment, a DVTR having the head arrangement shown in FIG. 6 has been described, but the head arrangement is not limited to the illustrated example. As an alternative arrangement, the magnetic heads with reverse azimuth may be placed at 90 degrees' intervals without offset provided between them, as shown in FIG. 26. However, when operating the DVTR having such a head arrangement in intermittent still-speed recording mode, since no offset is provided between the magnetic heads, the magnetic tape is momentarily fed first, and then, one track is recorded by one magnetic head; next, the magnetic tape is momentarily fed again, and then, the next track is recorded by the next magnetic head. Intermittent still-speed recording is accomplished by repeating this cycle of operation.

Figure 27:
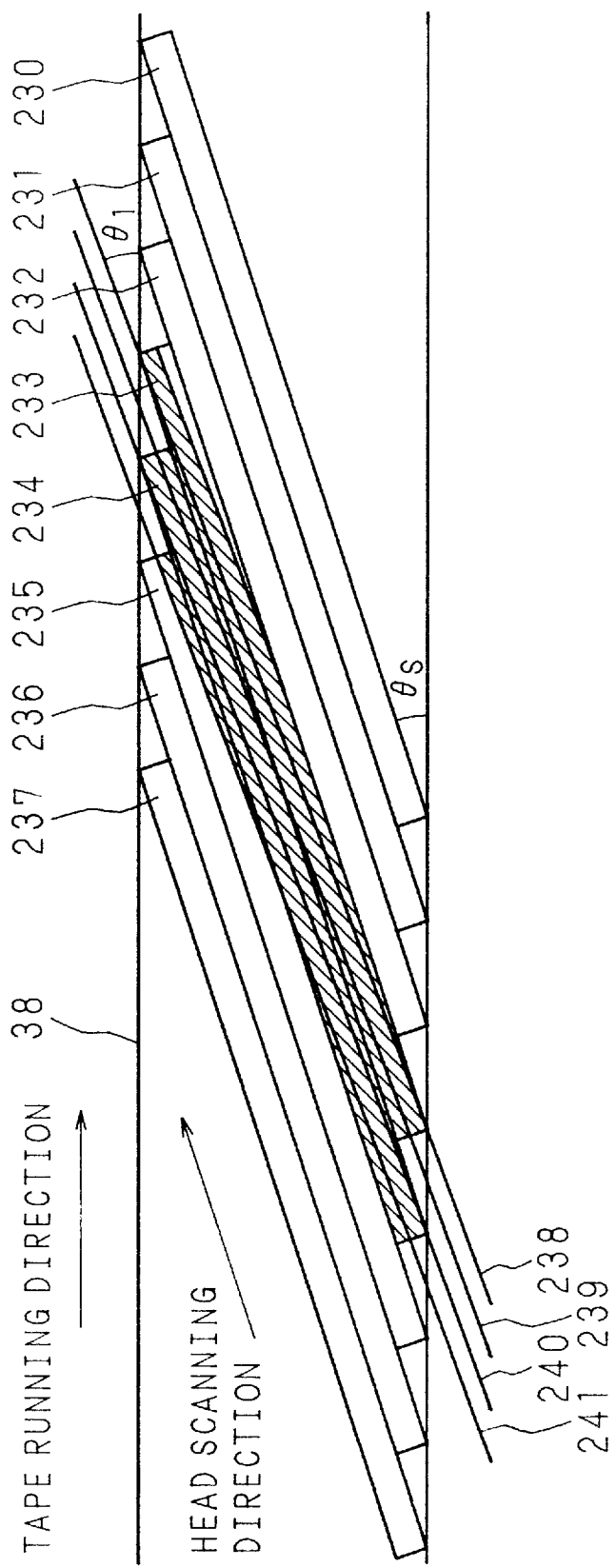
FIG. 27 is a diagram showing an example of head scanning loci in continuous feed playback mode according to one embodiment of the invention.

FIG. 27 shows the loci that the magnetic heads describe when the magnetic tape recorded in intermittent still-speed mode is played back on the DVTR having the head arrangement shown in FIG. 26 at the same tape speed as the normal playback speed but with the rotary drum 39 being rotated at twice the recording speed, as in the above embodiment. In FIG. 27, the reference numerals 230 to 237 indicate the tracks recorded in intermittent still-speed mode, each track having a slanting angle of θs. The numerals 238 to 241 indicate the scanning loci of the magnetic heads 37a, 37b, 37c, and 37d, the slanting angle being θ1. When the head width for playback is set equal to the track pitch, if the playback tracking is so set as to describe the loci indicated at 238 to 241 in FIG. 27, the shaded portions shown in the figure can be played back when the magnetic heads 37a, 37b, 37c, and 37d respectively make one scan over the recording tracks 233 and 234. As can be seen from FIG. 27, information equivalent to at least one-half the track width can be played back while each magnetic head makes at least one scan, thus achieving exactly the same effect as obtained in the above embodiment.

Figure 28A:
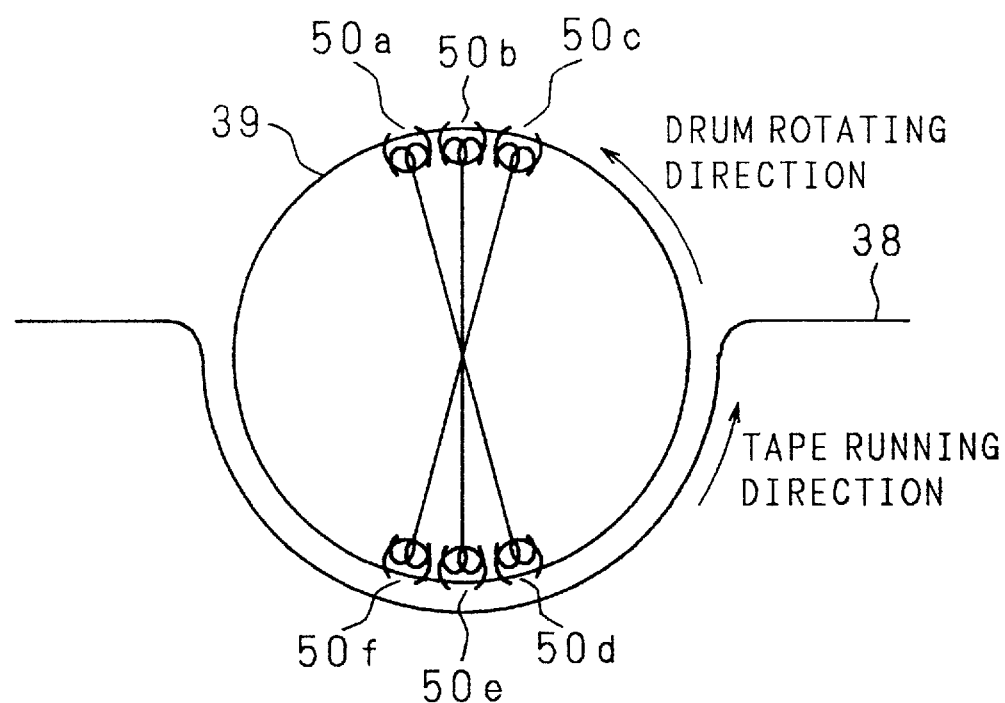
FIG. 28(a) is a diagram showing a magnetic head arrangement on a rotary drum according to one embodiment of the invention.
Figure 28B:
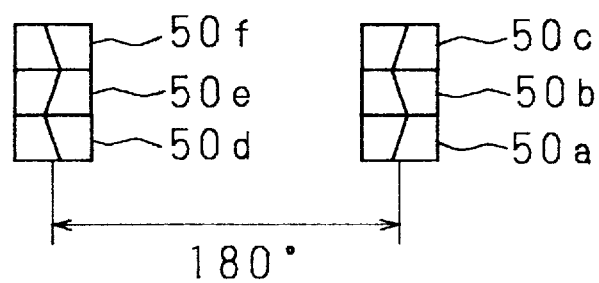
FIG. 28(b) is a diagram showing the height relationship between the magnetic heads on the rotary drum according to one embodiment of the invention.

In the above embodiment, description has been given by taking a two-channel DVTR as an example, and therefore, the rotary drum is rotated for playback at twice the recording speed. However, the embodiment is not limited to the illustrated example. As an alternative example, one group of three adjacent heads, 50a, 50b, and 50c, and another group of three adjacent heads, 50d, 50e, and 50f, may be arranged 180 degrees apart from each other, as shown in FIG. 28, with the azimuth relationship set as shown in FIG. 28(b). FIG. 29 shows the loci that the magnetic heads describe when the magnetic tape 38 recorded in intermittent still-speed mode is played back at the same tape speed as the normal playback speed but with the rotary drum 39 being rotated at three times the recording speed. In FIG. 29, the reference numerals 300 to 308 indicate the tracks recorded in intermittent still-speed mode, each track having a slanting angle of θs. The numerals 309 to 311 indicate the scanning loci of the magnetic heads 50a, 50b, and 50c, the slanting angle being θ3. When the head width for playback is set equal to the track pitch, if the playback tracking is so set as to describe the loci indicated at 309 to 311 in FIG. 29, the shaded portions shown in the figure can be played back when the magnetic heads 50a, 50b, and 50c respectively make one scan over the recording tracks 303, 304, and 305. As can be seen from FIG. 29, information equivalent to at least one-half the track width can be played back while each magnetic head makes at least one scan, thus achieving exactly the same effect as obtained in the above embodiment.

Figure 30A:
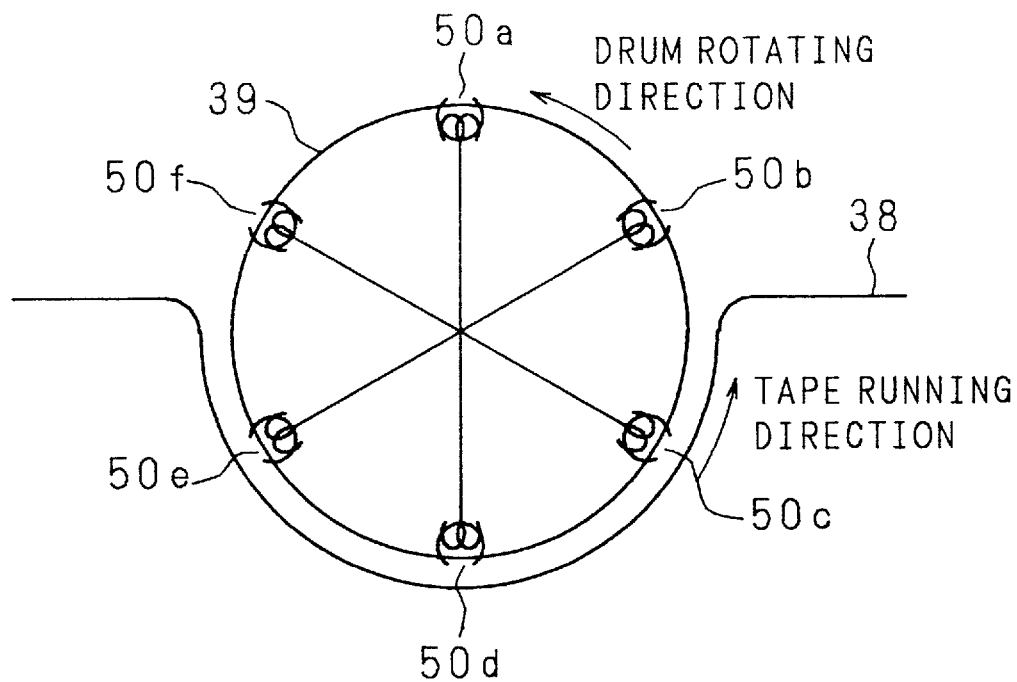
FIG. 30(a) is a diagram showing a magnetic head arrangement on a rotary drum according to one embodiment of the invention.
Figure 30B:
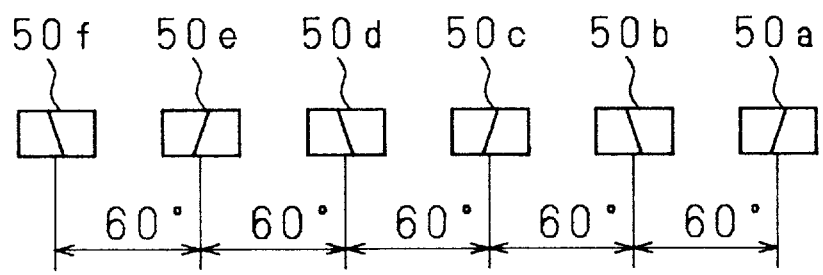
FIG. 30(b) is a diagram showing the height relationship between the magnetic heads on the rotary drum according to one embodiment of the invention.

In a further alternative example, as shown in FIG. 30, the magnetic heads, 50a, 50b, 50c, 50d, 50e, and 50f, may be arranged at intervals of 60 degrees, as in Embodiment 1, with the azimuth relationship set as shown in FIG. 30(b). In this example also, when the magnetic tape recorded in intermittent still-speed mode is played back at the same tape speed as the normal playback speed but with the rotary drum being rotated at three times the recording speed, if the head width for playback is set equal to the track pitch, information equivalent to at least one-half the track width can be played back while each magnetic head makes at least one scan, thus achieving exactly the same effect as obtained in the above embodiment.

To summarize Embodiment 3, in a VTR employing an N-channel recording system, if the rotary drum is rotated for playback at N times the recording speed, playback at +1 to −1 times the normal speed can be achieved.

Embodiment 3 described above has dealt with a DVTR, but the same effect can be obtained for an analog recording VTR. Further, in Embodiment 3, a multi-channel recording VTR has been described, but the same effect can be obtained for a multi-segment recording VTR. In the VTR described in Embodiment 3, video information for one-field period is multi-channel recorded, but the same effect can be obtained for a VTR in which video information for a prescribed period is divided into a prescribed number of tracks for recording.

According to Embodiment 3, when recording, intermittent still-speed recording is performed at predetermined intervals of time, and when playing back, the rotary drum is rotated at r (r≧N) times the recording speed while continuously feeding the magnetic tape at +1 to −1 times the normal playback speed. With this arrangement, almost all information recorded on one track can be played back by at least one scan out of r scans made by the magnetic heads, thus making it possible to reconstruct information faithful to the original information.

Embodiment 4 (3rd Invention)

The DVTR in Embodiment 4 has the same configuration as that described in Embodiment 3 (FIG. 22), and the recording and playback operations are fundamentally the same as those of the previously described DVTR. Therefore, these are not explained herein.

In the example hereinafter described, the drum speed for playback is the same as that for recording.

FIG. 23 shows the loci that the magnetic heads describe when the magnetic tape 38 recorded in intermittent still-speed mode is run at one-half the normal playback speed while rotating the rotary drum 39 at the same speed as for recording. In the figure, the reference numerals 200 to 207 indicate the tracks recorded in intermittent still-speed mode, each track having a slanting angle of θs. The numerals 208 and 209 indicate the scanning loci of the magnetic heads 37a, 37b or 37c, 37d, the slanting angle being θ1. When the head width for playback is set equal to the track pitch, if the playback tracking is so set as to describe the loci indicated at 208 and 209 in FIG. 23, the shaded portions in the recording tracks 203 and 204 are played back by the magnetic heads. As can be seen from FIG. 23, information equivalent to at least one-half the track width can be played back while each magnetic head makes at least one scan.

In this embodiment, since the head width is set equal to the track pitch, only the shaded portions in FIG. 23 can be played back. However, if the head width is set approximately equal to twice the track pitch, for example, all information on one track can be played back while the magnetic head makes at least one scan, as shown in FIG. 24. The original video information can then be reconstructed. In this case, however, the offset between adjacent magnetic heads need to be set equal to the track pitch. It is also clear that an error-correcting code having a lower error-correcting capability than the above error-correcting code may be used in this case.

FIG. 25 shows the loci that the magnetic heads describe when the magnetic tape 38 recorded in intermittent still-speed mode is played back at −½ the normal playback speed while rotating the rotary drum 39 at the same speed as for recording. In FIG. 25, the reference numerals 220 to 227 indicate the tracks recorded in intermittent still-speed mode, each track having a slanting angle of θs. The numerals 228 and 229 indicate the scanning loci of the magnetic heads 37a, 37b or 37c, 37d, the slanting angle being θ2. When the head width for playback is set equal to the track pitch, if the playback tracking is so set as to describe the loci indicated at 228 and 229 in FIG. 25, the shaded portions in the recording tracks 233 and 234 can be played back by the magnetic heads. As can be seen from FIG. 25, information equivalent to at least one-half the track width can be played back while each magnetic head makes at least one scan. When the head width is set approximately equal to twice the track pitch, as described above, all the information on one track can be played back while the magnetic head makes at least one scan; the original video signal can then be reconstructed.

In the above example, the magnetic tape speed during playback is specifically set at ±½ the normal playback speed, but it will be appreciated that the embodiment is also effective if the tape is played back at any speed between +½ and −½ the normal playback speed. This will be easily understood from the fact that the difference between the track angle θs in intermittent still-speed recording and the track angle θp in such playback becomes smaller than the difference between the track angle θs and the track angle θ1 in playback at ½ speed or θ2 in playback at −½ speed, so that the track angle θp becomes closer to θs.

Furthermore, in the above embodiment, a DVTR having the head arrangement shown in FIG. 6 has been described, but the head arrangement is not limited to the illustrated example. As an alternative arrangement, the magnetic heads with reverse azimuth may be placed at 90 degrees' intervals without offset provided between them, as shown in FIG. 26.

FIG. 27 shows the loci that the magnetic heads describe when the magnetic tape 38 recorded in intermittent still-speed mode is played back on the DVTR having the head arrangement shown in FIG. 26 at ½ the normal playback speed while rotating the rotary drum 39 at the same speed for recording, as in the above embodiment. In FIG. 27, the reference numerals 230 to 237 indicate the tracks recorded in intermittent still-speed mode, each track having a slanting angle of θs. The numerals 238 to 241 indicate the scanning loci of the magnetic heads 37a, 37b, 37c, and 37d, the slanting angle being θ1. When the head width for playback is set equal to the track pitch, if the playback tracking is so set as to describe the loci indicated at 238 to 241 in FIG. 27, the shaded portions shown in the figure can be played back when the magnetic heads 37a, 37b, 37c, and 37d respectively make one scan over the recording tracks 233 and 234. As can be seen from FIG. 27, information equivalent to at least one-half the track width can be played back while each magnetic head makes at least one scan, thus achieving exactly the same effect as obtained in the above embodiment.

In the above embodiment, description has been given by taking a two-channel DVTR as an example, and therefore, the rotary drum is rotated for playback at ±½ the normal playback speed. However, the embodiment is not limited to the illustrated example. As an alternative example, one group of three adjacent heads, 50a, 50b, and 50c, and another group of three adjacent heads, 50d, 50e, and 50f, may be arranged 180 degrees apart from each other, as shown in FIG. 28, with the azimuth relationship set as shown in FIG. 28(b). FIG. 29 shows the loci that the magnetic heads describe when the magnetic tape 38 recorded in intermittent still-speed mode is played back at ⅓ the normal playback speed while rotating the rotary drum 39 at the same speed as for recording. In FIG. 29, the reference numerals 300 to 308 indicate the tracks recorded in intermittent still-speed mode, each track having a slanting angle of θs. The numerals 309 to 311 indicate the scanning loci of the magnetic heads 50a, 50b, and 50c, the slanting angle being θ3. When the head width for playback is set equal to the track pitch, if the playback tracking is so set as to describe the loci indicated at 309 to 311 in FIG. 29, the shaded portions shown in the figure can be played back when the magnetic heads 50a, 50b, and 50c respectively make one scan over the recording tracks 303, 304, and 305. As can be seen from FIG. 29, information equivalent to at least one-half the track width can be played back while each magnetic head makes at least one scan, thus achieving exactly the same effect as obtained in the above embodiment.

In a further alternative example, as shown in FIG. 30, the magnetic heads, 50a, 50b, 50c, 50d, 50e, and 50f, may be arranged at intervals of 60 degrees, as in Embodiment 1, with the azimuth relationship set as shown in FIG. 30(b). In this example also, when the magnetic tape recorded in intermittent still-speed mode is played back at ⅓ the normal playback speed while rotating the rotary drum at the same speed as for recording, if the head width for playback is set equal to the track pitch, information equivalent to at least one-half the track width can be played back while each magnetic head makes at least one scan, thus achieving exactly the same effect as obtained in the above embodiment.

To summarize Embodiment 4, in a VTR employing an N-channel recording system, the tape speed for playback should be set at 1/N to −1/N the normal playback speed.

Embodiment 4 described above has dealt with a DVTR, but the same effect can be obtained for an analog recording VTR. Further, in Embodiment 4, a multi-channel recording VTR has been described, but the same effect can be obtained for a multi-segment recording VTR. In the VTR described in Embodiment 4, video information for one-field period is multi-channel recorded, but the same effect can be obtained for a VTR in which video information for a prescribed period is divided into a prescribed number of tracks for recording.

According to Embodiment 4, when recording, intermittent still-speed recording is performed at predetermined intervals of time, and when playing back, the magnetic tape is continuously fed at 1/v to −1/v the normal playback speed ($v \geq N$) while rotating the rotary drum at the same speed as for recording. With this arrangement, almost all information recorded on one track can be played back by at least one scan out of v scans made by the magnetic heads, thus making it possible to reconstruct information faithful to the original information.

Embodiment 5 (4th Invention)

As described in Embodiments 3 and 4, if the magnetic tape recorded in intermittent still-speed mode is to be played back in continuous feed mode, that is, if all the information recorded on each track is to be played back by the magnetic head, both the magnetic tape feed amount and the magnetic head scanning speed need to be controlled so that the magnetic head scans at least one-half the track width along the track while the magnetic tape is being fed by one track.

In Embodiment 3, the rotational number of the rotary drum, i.e. the scanning speed of the magnetic heads, is controlled, while in Embodiment 4, the running speed of the magnetic tape is controlled. To summarize these two embodiments, in a VTR in which information for one field is divided into N tracks for recording, control is performed so as to satisfy $|v| \geq N/r$ (N: positive integer, v: real number, r: positive real number)

when the magnetic tape is played back at 1/v times the normal playback speed and the rotary drum is rotated for playback at r times the recording speed. Then, when the magnetic tape recorded in intermittent still-speed mode is played back continuously at the prescribed speed, almost all information on the magnetic tape can be played back; therefore, information faithful to the original information can be obtained.

In Embodiments 3 and 4, FIGS. 23, 24, and 27 show the case of v=1, r=2, N=2, or v=2, r=1, N=2; FIG. 25 concerns the case of v=−1, r=2, N=2, or v=−2, r=1, N=2; and FIG. 29 represents the case of v=1, r=3, N=3, or v=−3, r=1, N=3.

In Embodiment 5, when recording, intermittent still-speed recording is performed at predetermined intervals of time, and when playing back, the magnetic tape is run at 1/v times the normal playback speed and the rotary drum is rotated at r times the recording speed. In operation, control is performed so as to satisfy $|v| \geq N/r$ (N: positive integer, v: real number, r: positive real number)

Therefore, almost all information recorded on one track can be played back from the magnetic tape by at least one scan, so that information faithful to the original information can be obtained.

Embodiment 6 (5th Invention)

Figure 31:
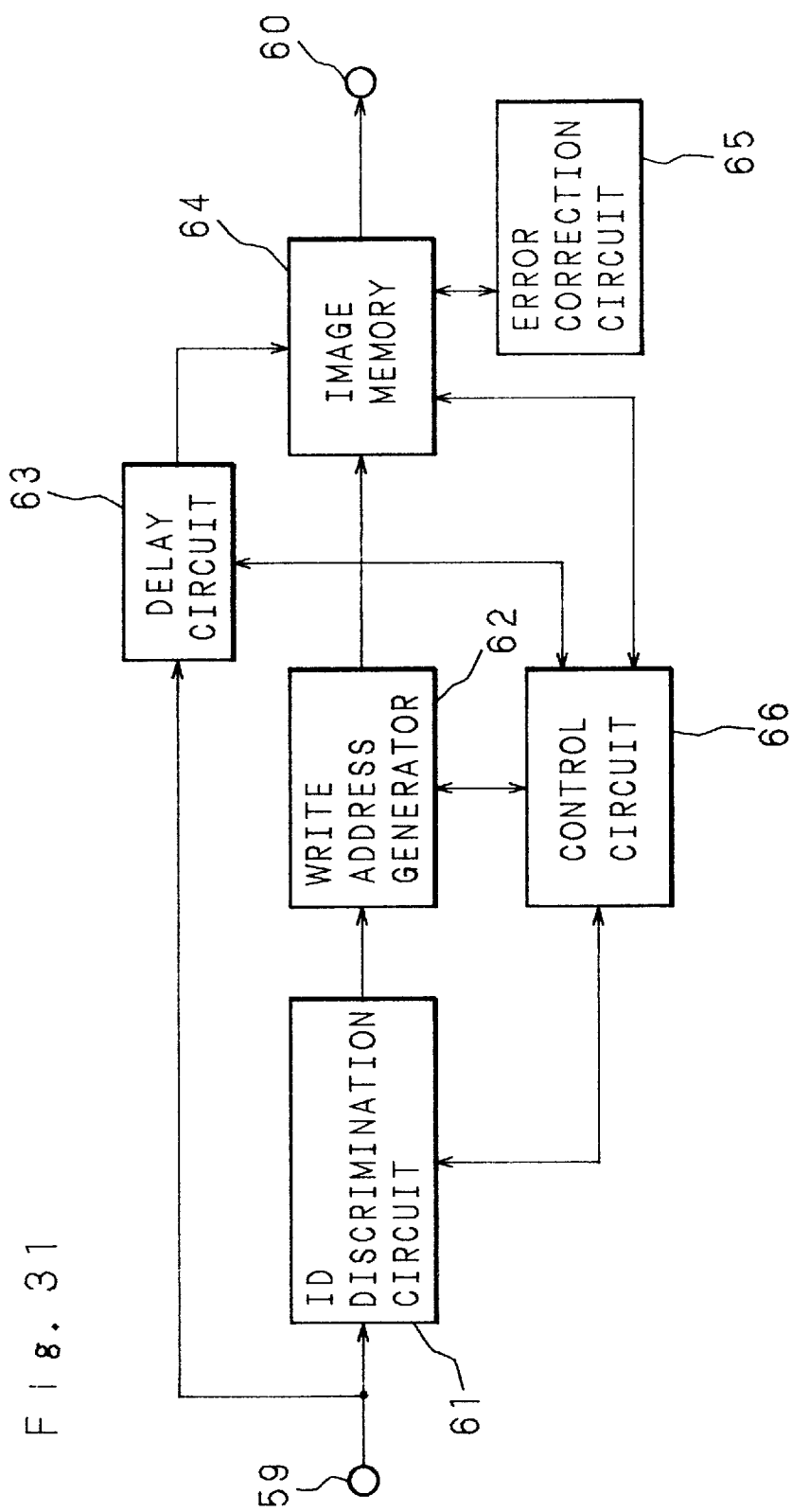
FIG. 31 is a block diagram showing the configuration of a magnetic recording and reproducing apparatus according to one embodiment of the invention.
Figure 32:
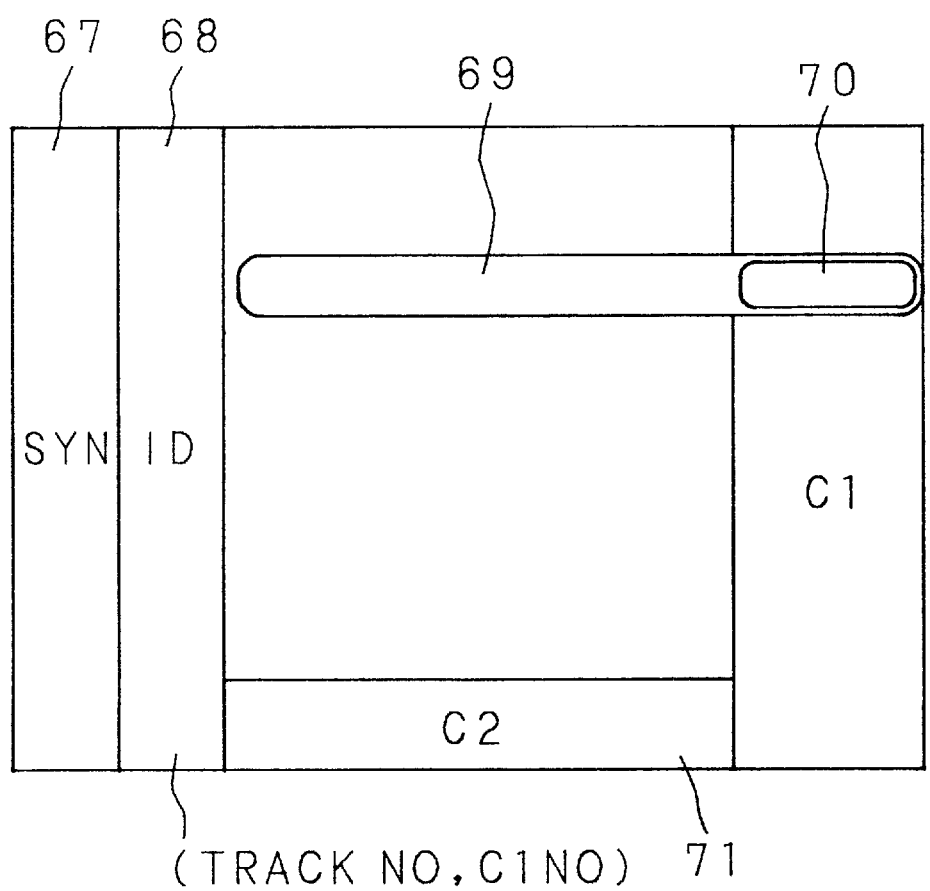
FIG. 32 is a diagram showing an error-correcting code format according to one embodiment of the invention.
Figure 33:
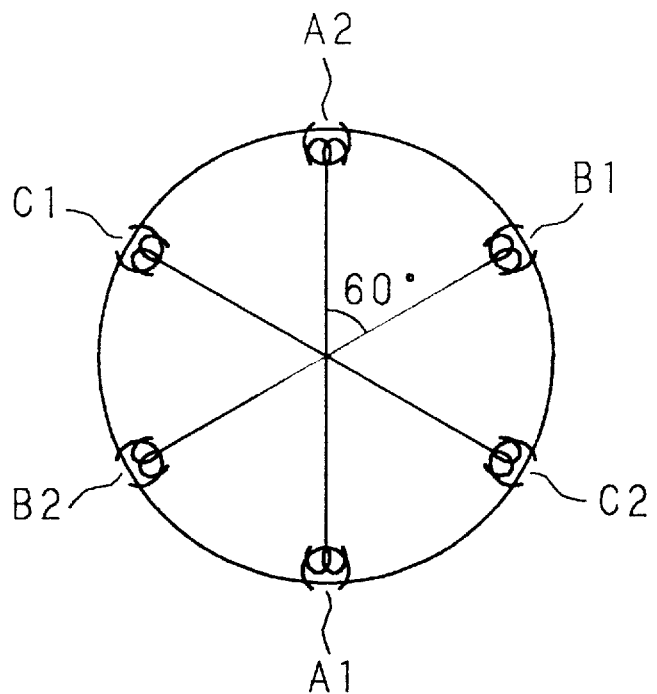
FIG. 33 is a diagram showing a magnetic head arrangement on a rotary drum according to one embodiment of the invention.
Figure 34:
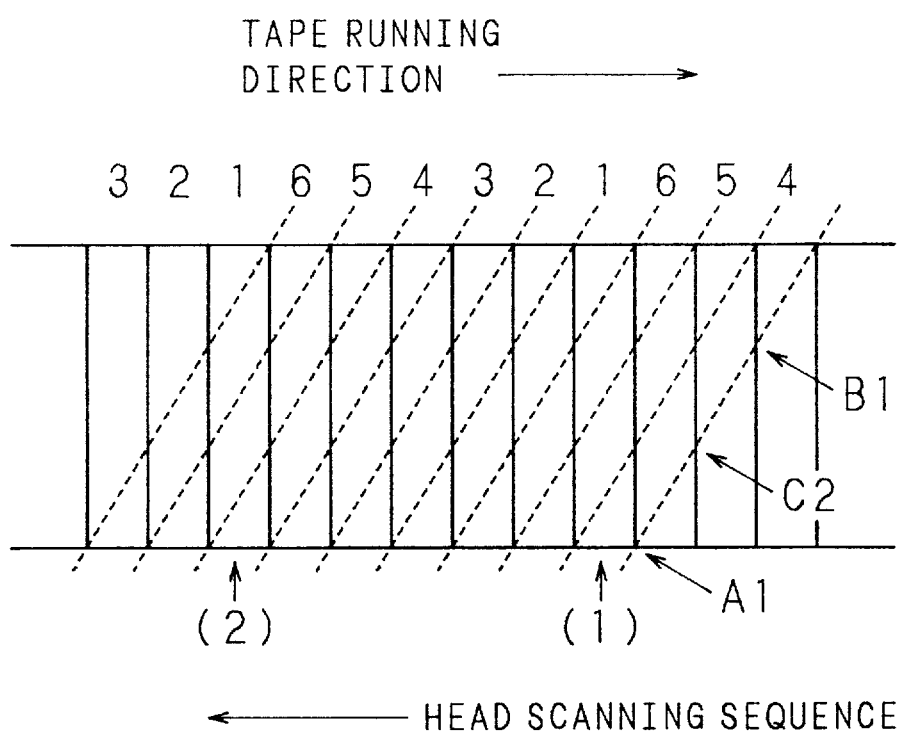
FIG. 34 is a diagram for explaining the operation when a magnetic tape recorded in normal recording mode is played back in intermittent drive slow speed playback mode according to one embodiment of the invention.
Figure 35:
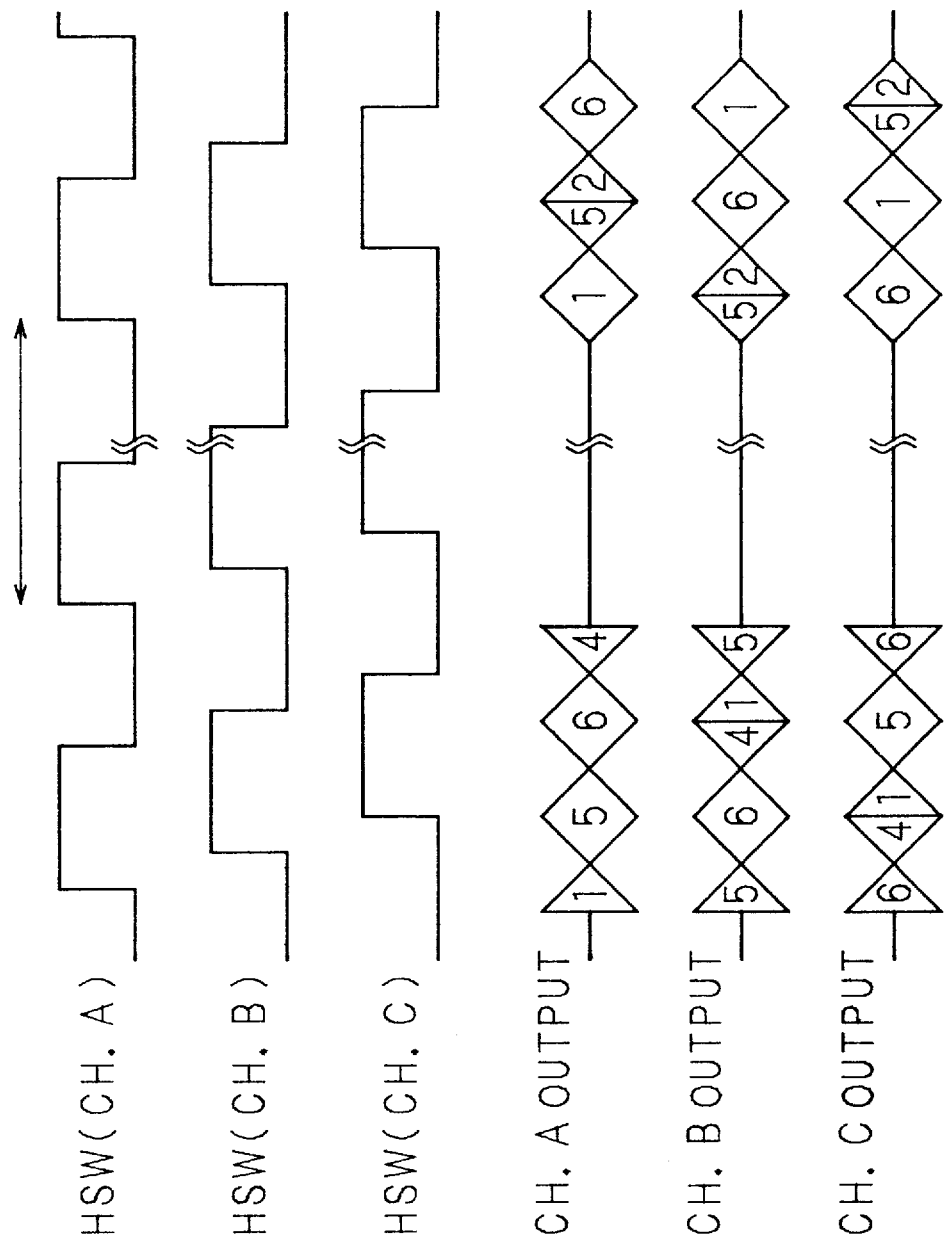
FIG. 35 is a diagram for explaining data outputs of three channels during intermittent drive slow speed playback according to one embodiment of the invention.
Figure 36:
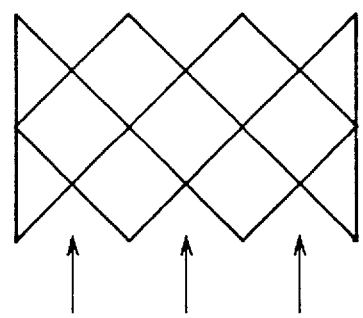
FIG. 36 is a diagram showing reassembled data for one track according to one embodiment of the invention.

FIG. 31 is a block diagram showing the configuration of Embodiment 6 of the present invention; FIG. 32 is an error-correcting code (ECC) format used in Embodiment 6; FIG. 33 is a diagram showing a magnetic head arrangement on a rotary drum according to Embodiment 6; FIG. 34 is a diagram for explaining how the tape is played back in normal and still-motion (still frame) playback modes; FIG. 35 is a diagram for explaining channel outputs when data is played back in intermittent drive mode; and FIG. 36 is a diagram showing image field information reassembled in an image memory by combining signals from one track. The term "intermittent drive" refers to a technique whereby image data recorded in normal mode is played back frame by frame in still motion. In still-motion playback mode, the magnetic tape is scanned after it is fed by one frame and comes to a complete stop; therefore, the track angle is different from that in normal playback mode. The scanning lines in still-motion mode are indicated by dotted lines in FIG. 34.

In FIG. 31, the reference numeral 59 is an information input terminal, 60 is an information output terminal, 61 is an ID discrimination circuit, 62 is a write address generator, 63 is a delay circuit, 64 is a one-field or one-frame image memory, 65 is an error correction (ECC) circuit, and 66 is a control circuit. In FIG. 32, 67 is a synchronizing pattern, 68 is an ID area, 69 is a C1 codeword, 70 is a check symbol area for the C1 codeword, and 71 is a check symbol area for C2 codeword.

In the 3-channel, 6-head magnetic head arrangement shown in FIG. 33, it is assumed that each channel is recorded by two magnetic heads with reverse azimuth, and that the magnetic heads are placed on the circumference with no offset. In digital recording of an image, six tracks are used to record and play back one-field data. Referring to FIG. 34, in normal recording mode, the magnetic head that scans the magnetic tape at position (1) for recording will be scanning the magnetic tape again six channels after at position (2) for recording. In normal mode, information is recorded as three channels, as shown in FIG. 34, each channel being recorded by two magnetic heads placed at opposite sides of the drum. The numbers shown above the magnetic tape indicate the recording sequence on the magnetic tape. In normal playback mode, the magnetic heads scan the magnetic tape in the same sequence as in recording, so that the data are played back in the same sequence as recorded. When data recorded in normal mode is played back in intermittent mode, the magnetic tape is scanned with a track angle different from the recorded track angle, as shown by the dotted line.

Suppose that A1 head is now scanning the magnetic tape at position (1) in FIG. 34. At this moment, since B1 head is 120 degrees apart from the A1 head, the B1 head is at the position B1 on the magnetic tape. On the other hand, since C1 head is 120 degrees apart from the B1 head, C2 head on the opposite side from the C1 head is at the position C2 60 degrees apart from the A1 head on the magnetic tape. Therefore, as shown in FIG. 35, for channel A output, the triangular portion in the lowermost portion of track 1 is first played back, and then, data in the rhomboidal portion in the upper part of track 5 is played back. In intermittent playback mode, since the magnetic tape is held at rest, the opposing A2 head reads data recorded with reverse azimuth, and thus plays back data in the rhomboidal portion in the lower part of track 6 and data in the triangular portion in the uppermost portion of track 4. Likewise, the B1 head plays back data in tracks 5 and 6, and the B2 head plays back data in tracks 4, 1, and 5. Similarly, the C2 head plays back data in tracks 6 and 4, and the C1 head plays back data in tracks 1 and 5. Data in each track is encoded with the ECC form at shown in FIG. 32. The data is encoded into a plurality of C1 codewords. In some cases, the data may be further encoded in columns into C2 codewords, to form product codes.

The ID 68 area of each C1 codeword holds the track number and the C1 number of the block that indicates the sequence number of the C1 codeword. One track consists of one or more blocks. The ID discrimination circuit 61 discards data that cannot be read by the ID area 68. The write address generator 62 calculates the address of the block format from the data that has been successfully read, and the data synchronized through the delay circuit 63 is written at the specified address in the image memory 64. As can be seen from FIG. 34, since the same data are read several times, the data that failed to be read are discarded, and in some case, the data that have been successfully read may be overwritten there. Therefore, as shown in FIG. 36, data for one track is divided into several portions which are written at different times. However, since any of such portions can be reconstructed from the data reproduced from a data region larger than at least one-half the track width, the format corresponding to the original code format (FIG. 32) is reconstructed in the image memory 64. The reconstructed receive format is fed to the error correction circuit 65 for error correction, and then output at the information output terminal 60.

According to Embodiment 6, in a helical scan magnetic recording and reproducing apparatus, when the magnetic tape recorded in normal record mode is played back in slow speed mode by intermittent driving, information for one track is played back from the magnetic tape by at least one scan, thus making it possible to play back an image at slow speed by intermittent driving.

Embodiment 7 (6th Invention)

Figure 37:
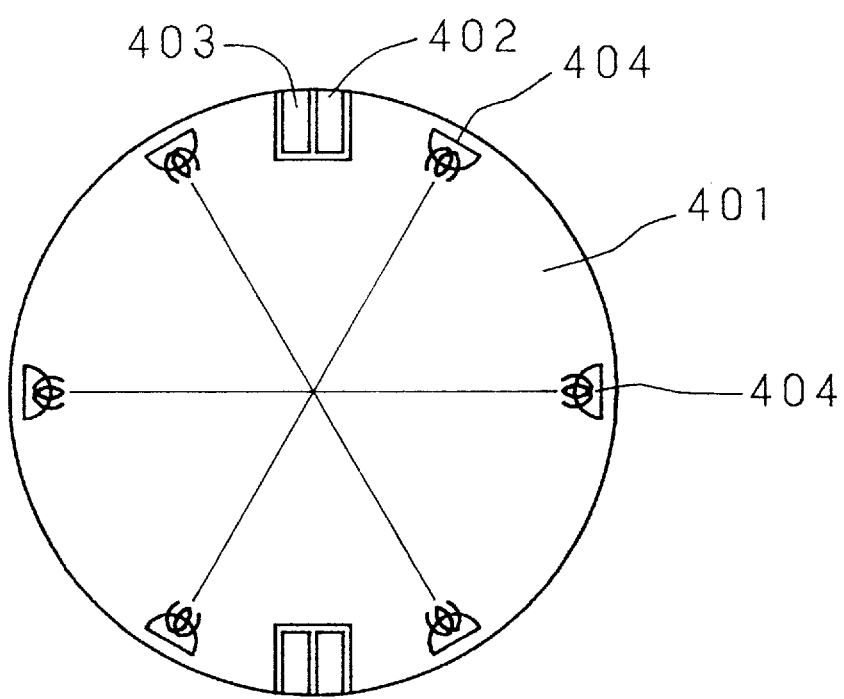
FIG. 37 is a diagram showing a magnetic head arrangement according to one embodiment of the invention.
Figure 38:
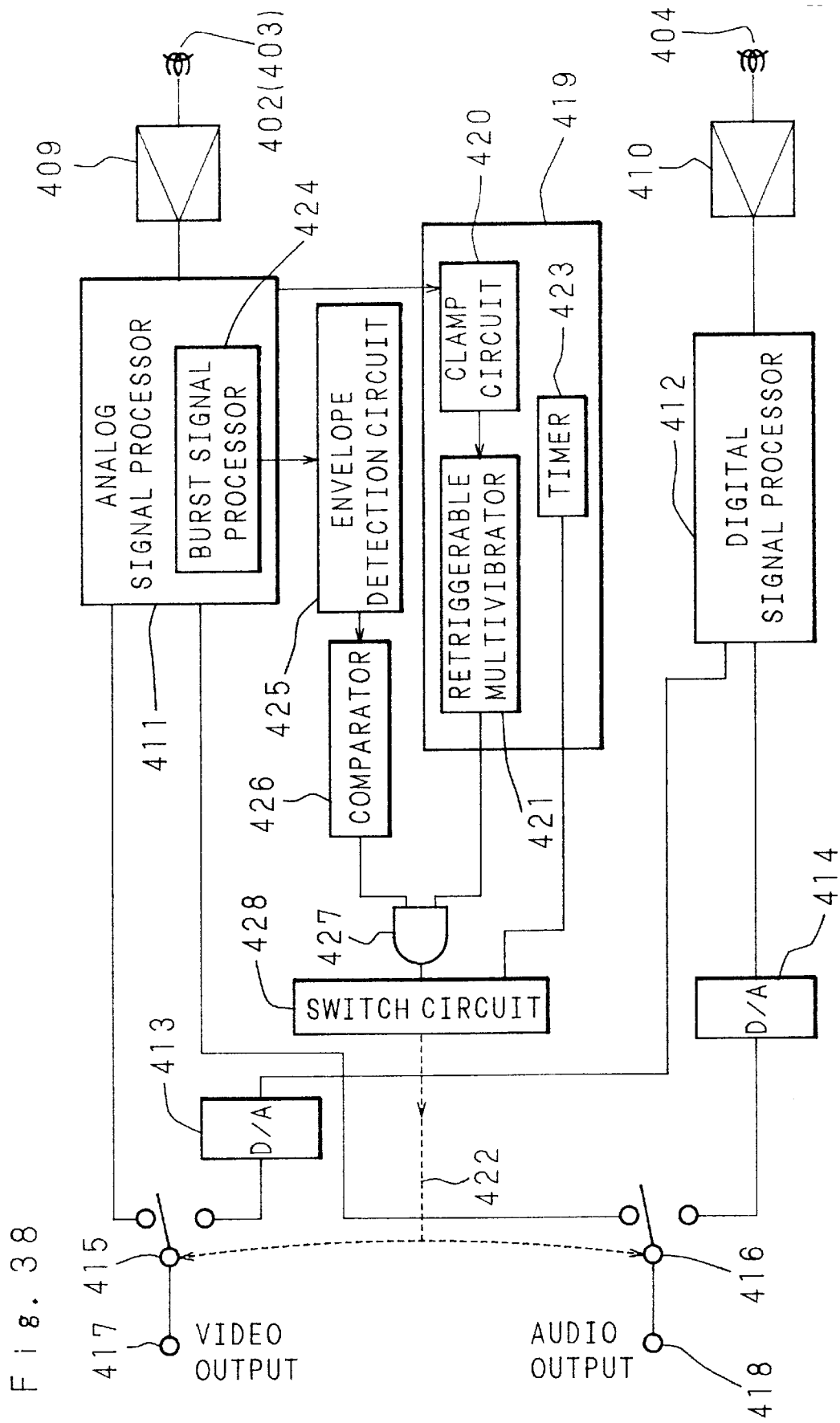
FIG. 38 is a block diagram showing a reproducing system according to one embodiment of the invention.

FIG. 37 is a diagram showing a head arrangement according to Embodiment 7 of the invention, and FIG. 38 is a block diagram showing a reproducing system according to Embodiment 7. In FIG. 37, the reference numeral 401 is a drum, 402 is an analog standard-mode playback head, 403 is an analog long-playing-mode playback head, and 404 is a digital playback head. In FIG. 38, the reference numeral 409 is an analog playback amplifier, 410 is a digital playback amplifier, 411 is an analog signal processor that contains a burst signal processor 424, 412 is a digital signal processor, 413 and 414 are D/A converters, 415 is a video output switch, 416 is an audio output switch, 417 is a video output terminal, 418 is an audio output terminal, 419 is a horizontal synchronizing signal detection circuit for detecting a horizontal synchronizing signal in the analog signal, 425 is an envelope detection circuit for detecting the envelope of the burst signal supplied from the burst signal processor 424, 426 is a comparator, 427 is an AND gate, and 428 is a switch circuit. The horizontal synchronizing signal detection circuit 419 consists of a clamp circuit 420, a retriggerable multivibrator 421 having a time constant sufficiently longer than the horizontal synchronizing period, and a timer 423 that counts time and that causes the output of the digital signal processor 412 to be selected in the case of the absence of a horizontal synchronizing signal within a fixed period of time.

The operation of this embodiment will now be described. When digitized, the NTSC video signal translates into a digital transmission rate of about 2000 Mbps. If the digitized video signal is to be compressed using such a technique as discrete cosine transform without causing appreciable image degradation, a compression ratio of $1/7$ to $1/10$ would be appropriate, in which case the transmission rate would be about 30 to 40 Mbps. On the other hand, the highest recordable frequency of an S-VHS tape is about 8 MHz; if recorded without guard bands by using NRZI magnetic recording modulation such as 8–10 conversion, and if recorded with signals having reduced low frequency components by azimuth recording using a 3-channel 6-head drum, the NTSC signal can be digitally recorded on an S-VHS tape.

Figure 39:
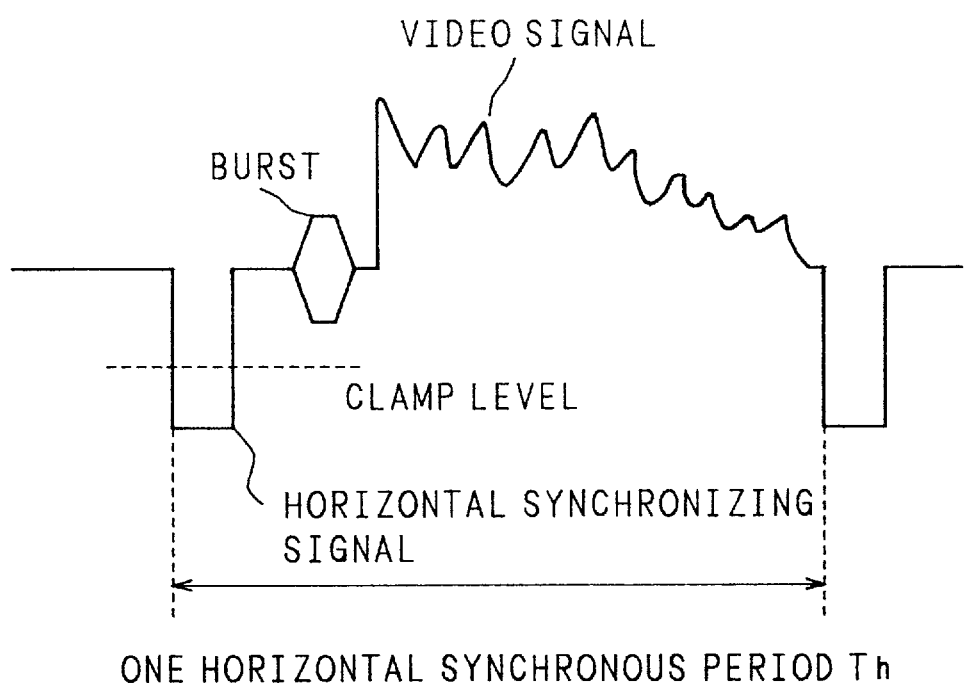
FIG. 39 is a diagram showing an analog video signal during one horizontal period according to one embodiment of the invention.
Figure 40:
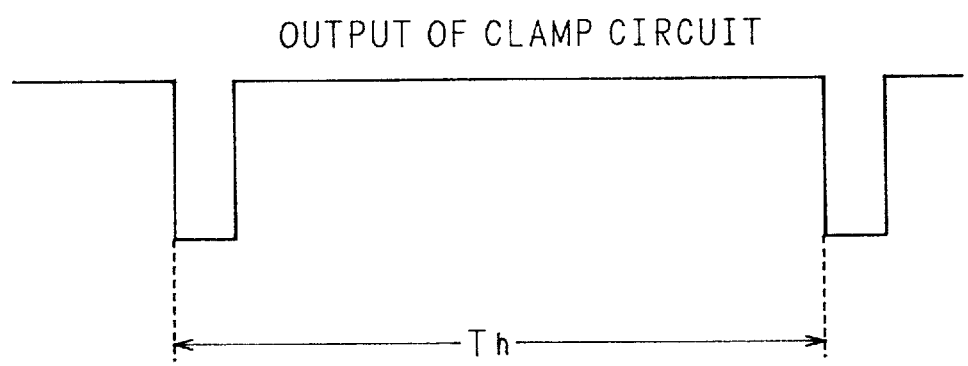
FIG. 40 is a waveform diagram showing an output of a clamp circuit according to one embodiment of the invention.

The signal is input via the analog head 402 (or 403) or the digital head 404. If the recorded signal is analog, the signal input via the analog head 402 (or 403) is amplified by the analog playback amplifier 409 and then supplied to the analog signal processor 411. FIG. 39 shows the waveform of the analog video signal. The horizontal synchronizing signal is received for every horizontal synchronous period Th (about 63 $\mu$sec.). This signal is extracted and input to the clamp circuit 420 which clamps it by a threshold value of a level that has no relevance to the video signal. FIG. 40 shows the resulting waveform. The waveform is shaped by the retriggerable multivibrator 421 having a time constant longer than one horizontal synchronous period Th, to produce a horizontal synchronizing signal detection signal 422 by which the switches 415 and 416 are controlled so that the analog signal information from the analog signal processor 411 is output through the output terminals 417 and 418.

On the other hand, if the recorded signal is digital, the timer 423 detects the absence of the horizontal synchronizing signal detection signal 422 after a fixed period of time, and sets the switches 415 and 416 to the digital signal side to output the information.

The burst signal processor 424 extracts the burst signal and supplies it to the envelope detection circuit 425 for detection of the envelope amplitude. The resulting detection signal is compared with a prescribed threshold value in the comparator 426 which supplies the result of the comparison to the AND gate 427. This arrangement ensures accurate discrimination between the analog and digital signals.

In the above example, the horizontal synchronizing signal is used to discriminate the analog signal, but instead, the vertical synchronizing signal may be used. The above embodiment has been described by taking the VHS system as an example, but it will be recognized that the embodiment is also applicable to an 8 mm VTR.

As described above, in Embodiment 7, an analog playback head and a digital playback head are mounted on the same drum, and the presence or absence of the horizontal synchronizing signal (or vertical synchronizing signal) carried in the analog signal is detected, on the basis of which the playback mode is automatically switched between the analog signal and digital signal playback modes. The reproducing system is thus capable of playing back tape of both digital and analog recordings.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A method for helical scan magnetic recording and reproduction, comprising:
   (a) rotatably disposing a rotary drum in contact with a recording medium, said rotary drum having a number N of magnetic heads arranged on a periphery thereof, each of said N magnetic heads being equally spaced apart and having no offset with respect to one another in an axial direction of said rotary drum;
   (b) dividing a signal for one field of image information into m channels, where m is an integer equal to or greater than 3;
   (c) digitally recording said signal for one field of image information by recording said divided signal in said number N of recording operations both in a continuous recording mode and an intermittent recording mode, where said number N is an integer not smaller than 3 but not greater than m, wherein an amount of data equal to said one field divided by said number N is recorded in a single recording operation, said single recording operation being when one of said N magnetic heads scans said recording medium to record one track;
   in said continuous recording mode,
   (d) continuously feeding said recording medium such that a first track is recorded while said recording medium is being fed,
   in said intermittent recording mode,
   (e) recording said first track on said recording medium by a first of said magnetic heads such that said first track is recorded while feeding of said recording medium is being stopped;
   (f) intermittently feeding said recording medium such that said recording medium is fed by an amount corresponding to a width of said first track after recording of said first track; and
   (g) recording a second track adjacent to said first track by a second of said magnetic heads such that said second track is recorded while feeding of said recording medium is being stopped;
   (h) intermittently feeding said recording medium such that said recording medium is fed by an amount corresponding to a width of said second track after recording of said second track; and
   (i) recording a third track adjacent to said second track by a third of said magnetic heads such that said third track is recorded while feeding of said recording medium is being stopped.

2. The method of claim 1, further comprising:
   in said intermittent reproducing mode,
   (j) reproducing a fourth track by said first magnetic head while feeding of said recording medium has been stopped.

3. The method of claim 2, further comprising:
   in said intermittent reproducing mode,
   (j) reproducing a fifth track by said second magnetic head while feeding of said recording medium has been stopped.

4. The method of claim 3, further comprising:
   in said intermittent reproducing mode,
   (k) feeding said recording medium by an amount corresponding to a width of said fourth track after reproduction of said fourth track has completed.

5. A helical scan magnetic recording and reproducing apparatus, comprising:
   a rotary drum rotatably disposed in contact with a recording medium, said rotary drum having three magnetic heads being arranged on a periphery thereof, said three magnetic heads being equally spaced apart and having no offset with respect to one another in an axial direction of said rotary drum, a signal for one field of image information being recorded by dividing said signal into three channels and recording said divided signal in three recording operations both in a continuous recording mode and an intermittent recording mode, wherein an amount of data equal to said one field divided by three is recorded in a single recording operation, said single recording operation being when one of said three magnetic heads scans said recording medium to record one track; and
   feeding means for continuously feeding said recording medium in a continuous recording mode such that, with respect to said magnetic heads, tracks are recorded on said recording medium in a first order, and intermittently feeding said recording medium in an intermittent recording mode such that, with respect to said magnetic heads, tracks are recorded on said recording medium in said first order.

6. A method for helical scan magnetic recording and reproduction on a recording medium, comprising:
   (a) rotatably disposing a rotary drum in contact with said recording medium, said rotary drum having three magnetic heads being arranged on a periphery thereof, each of said three magnetic heads being equally spaced apart and having no offset with respect to one another in an axial direction of said rotary drum;
   (b) dividing a signal for one field of image information into three channels;
   (c) digitally recording said signal for one field of image information by recording said divided signal in three recording operations both in a continuous recording mode and an intermittent recording mode, wherein an amount of data equal to said one field divided by three is recorded in a single recording operation, said single recording operation being when one of said three magnetic heads scans said recording medium to record one track; and
   (d) continuously feeding said recording medium in a continuous recording mode such that, with respect to said magnetic heads, tracks are recorded on said recording medium in a first order, and intermittently feeding said recording medium in an intermittent recording mode such that, with respect to said magnetic heads, tracks are recorded on said recording medium in said first order.

7. A helical scan magnetic recording and reproducing apparatus, comprising:

a rotary drum rotatably disposed in contact with a recording medium, said rotary drum having a number N of magnetic heads being arranged on a periphery thereof, said N magnetic heads being equally spaced apart and having no offset with respect to one another in an axial direction of said rotary drum, a signal for one field of image information being recorded by dividing said signal into m channels, where m is an integer equal to or greater than 3, and recording said divided signal in said number N of recording operations both in a continuous recording mode and an intermittent recording mode, where said N is an integer not smaller than 3 but not greater than m, wherein an amount of data equal to said one field divided by said number N is recorded in a single recording operation, said single recording operation being when one of said N magnetic heads scans said recording medium to record one track;

a first of said magnetic heads recording a first track while feeding of said recording medium has been stopped in said intermittent recording mode;

a second of said magnetic heads recording a second track adjacent to said first track while feeding of said recording medium has been stopped in said intermittent recording mode;

a third of said magnetic heads recording a third track adjacent to said second track while feeding of said recording medium has been stopped in said intermittent recording mode; and feeding means for intermittently feeding said recording medium in said intermittent recording mode such that said recording medium is fed by an amount corresponding to a width of said first track after recording of said first track by said first magnetic head and prior to recording of said second track by said second magnetic head, and by an amount corresponding to a width of said second track after recording of said second track by said second magnetic head and prior to recording of said third track by said third magnetic head.

8. A method for helical scan magnetic recording and reproduction, comprising:

(a) rotatably disposing a rotary drum in contact with a recording medium, said rotary drum having a number N of magnetic heads on a periphery of said rotary drum, each of said number N of magnetic heads being equally spaced apart and having no offset with respect to one another in an axial direction of said rotary drum;

(b) dividing a signal for one field of image information into m channels, where m is an integer equal to or greater than 3;

(c) digitally recording said signal for one field of image information by recording said divided signal in said number N recording operations both in a continuous recording mode and an intermittent recording mode, where said number N is an integer not smaller than 3 but not greater than m, wherein an amount of data equal to said one field divided by said number N is recorded in a single recording operation, said single recording operation being when one of said N magnetic heads scans said recording medium to record one track; in said intermittent recording mode, (d) recording a first track on said recording medium by a first of said magnetic heads such that said first track is recorded while feeding of said recording medium has been stopped;

(e) intermittently feeding said recording medium such that said recording medium is fed by an amount corresponding to a width of said first track after recording of said first track; and (f) recording a second track adjacent to said first track by a second of said magnetic heads such that said second track is recorded while feeding of said recording medium has been stopped;

(g) intermittently feeding said recording medium such that said recording medium is fed by an amount corresponding to a width of said second track after recording of said second track; and (h) recording a third track adjacent to said second track by a third of said magnetic heads such that said third track is recorded while feeding of said recording medium has been stopped.

9. A helical scan magnetic recording and reproducing apparatus, comprising:

a rotary drum rotatably disposed in contact with a recording medium, said rotary drum having a number N of magnetic heads being arranged on a periphery thereof, said number N of magnetic heads being equally spaced apart and having no offset with respect to one another in an axial direction of said rotary drum, a signal for one field of image information being recorded by dividing said signal into m channels, where m is an integer equal to or greater than 3, and recording said divided signal in said number N of recording operations both in a continuous recording mode and an intermittent recording mode, where said N is an integer not smaller than 3 but not greater than m, wherein an amount of data equal to said one field divided by said number N is recorded in a single recording operation, said single recording operation being when one of said N magnetic heads scans said recording medium to record one track; and feeding means for continuously feeding said recording medium in said continuous recording mode such that, with respect to said magnetic heads, tracks are recorded on said recording medium in a first order, and intermittently feeding said recording medium in said intermittent recording mode such that, with respect to said magnetic heads, tracks are recorded on said recording medium in said first order.

10. The apparatus of claim 9, wherein in said intermittent reproducing mode, first, second and third heads of said number N of magnetic heads respectively record first, second, and third adjacent tracks while feeding of said recording medium has been stopped, and said first of said number N of magnetic heads reproduces a fourth track while feeding of said recording medium has been stopped.

11. The apparatus of claim 10, wherein in said intermittent reproducing mode, said second of said number N of magnetic heads reproduces a fifth track adjacent to said fourth track while feeding of said recording medium has been stopped.

12. The apparatus of claim 11, wherein in said intermittent reproducing mode, said feeding means feeds said recording medium by an amount corresponding to a width of said fourth track after reproduction of said fourth track by said first of said number N of magnetic heads and prior to reproducing of said fifth track by said second of said number N of magnetic heads.

13. A method for helical scan magnetic recording and reproduction on a recording medium, comprising:

(a) rotatably disposing a rotary drum in contact with said recording medium, said rotary drum having number N of magnetic heads being arranged on a periphery thereof, each of said number N of magnetic heads being equally spaced apart and having no offset with respect to one another in an axial direction of said rotary drum;

(b) dividing a signal for one field of image information into m channels, where m is an integer equal to or greater than 3;

(c) digitally recording said signal for one field of image information by recording said divided signal in said number N of recording operations both in a continuous recording mode and an intermittent recording mode, where said number N is an integer not smaller than 3 but not greater than m, wherein an amount of data equal to said one field is recorded in a single recording operation, said single recording operation being when one of said number N of magnetic heads scans said recording medium to record one track; and (d) continuously feeding said recording medium in said continuous recording mode such that, with respect to said magnetic heads, tracks are recorded on said recording medium in a first order, and intermittently feeding said recording medium in said intermittent recording mode such that, with respect to said magnetic heads, tracks are recorded on said recording medium in said first order.

* * * * *